US012752938B2

(12) United States Patent
Lu et al.

(10) Patent No.: US 12,752,938 B2
(45) Date of Patent: Oct. 6, 2026

(54) SYSTEMS AND METHODS FOR A TRANSFORMABLE UNMANNED AERIAL VEHICLE WITH COPLANAR AND OMNIDIRECTIONAL FEATURES

(71) Applicants: Shi Lu, Mesa, AZ (US); Yan Chen, Chandler, AZ (US); Konstantinos Tsakalis, Chandler, AZ (US); Armando Rodriguez, Tempe, AZ (US)

(72) Inventors: Shi Lu, Mesa, AZ (US); Yan Chen, Chandler, AZ (US); Konstantinos Tsakalis, Chandler, AZ (US); Armando Rodriguez, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 43 days.

(21) Appl. No.: 19/041,032

(22) Filed: Jan. 30, 2025

(65) Prior Publication Data

US 2025/0171170 A1 May 29, 2025

Related U.S. Application Data

(63) Continuation of application No. 18/335,900, filed on Jun. 15, 2023, now Pat. No. 12,246,861.

(60) Provisional application No. 63/352,551, filed on Jun. 15, 2022.

(51) Int. Cl.

*B64U 10/16* (2023.01)
*B64U 30/29* (2023.01)
*B64U 30/297* (2023.01)
*B64U 40/20* (2023.01)

(52) U.S. Cl.

CPC ............. *B64U 10/16* (2023.01); *B64U 30/29* (2023.01); *B64U 30/297* (2023.01); *B64U 40/20* (2023.01)

(58) Field of Classification Search

CPC ...... B64U 10/16; B64U 30/29; B64U 30/297; B64U 40/20; B64U 10/13

See application file for complete search history.

(56) References Cited

U.S. PATENT DOCUMENTS

2018/0155011 A1* 6/2018 Greiner ................... B64C 15/02

* cited by examiner

*Primary Examiner* — Michael V Kerrigan
(74) *Attorney, Agent, or Firm* — Polsinelli PC

(57) ABSTRACT

A transformable Unmanned Aerial Vehicle (UAV), can operate as a coplanar hexacopter or as an omnidirectional multirotor based on different operation modes. The UAV has 100% force efficiency for launching or landing tasks in the coplanar mode. In the omnidirectional mode, the UAV is fully actuated in the air for agile mobility in six degrees of freedom (DOFs). Models and control design are developed to characterize the motion of the transformable UAV. Simulation results are presented to validate the transformable UAV design and the enhanced UAV performance, compared with a fixed structure.

20 Claims, 19 Drawing Sheets

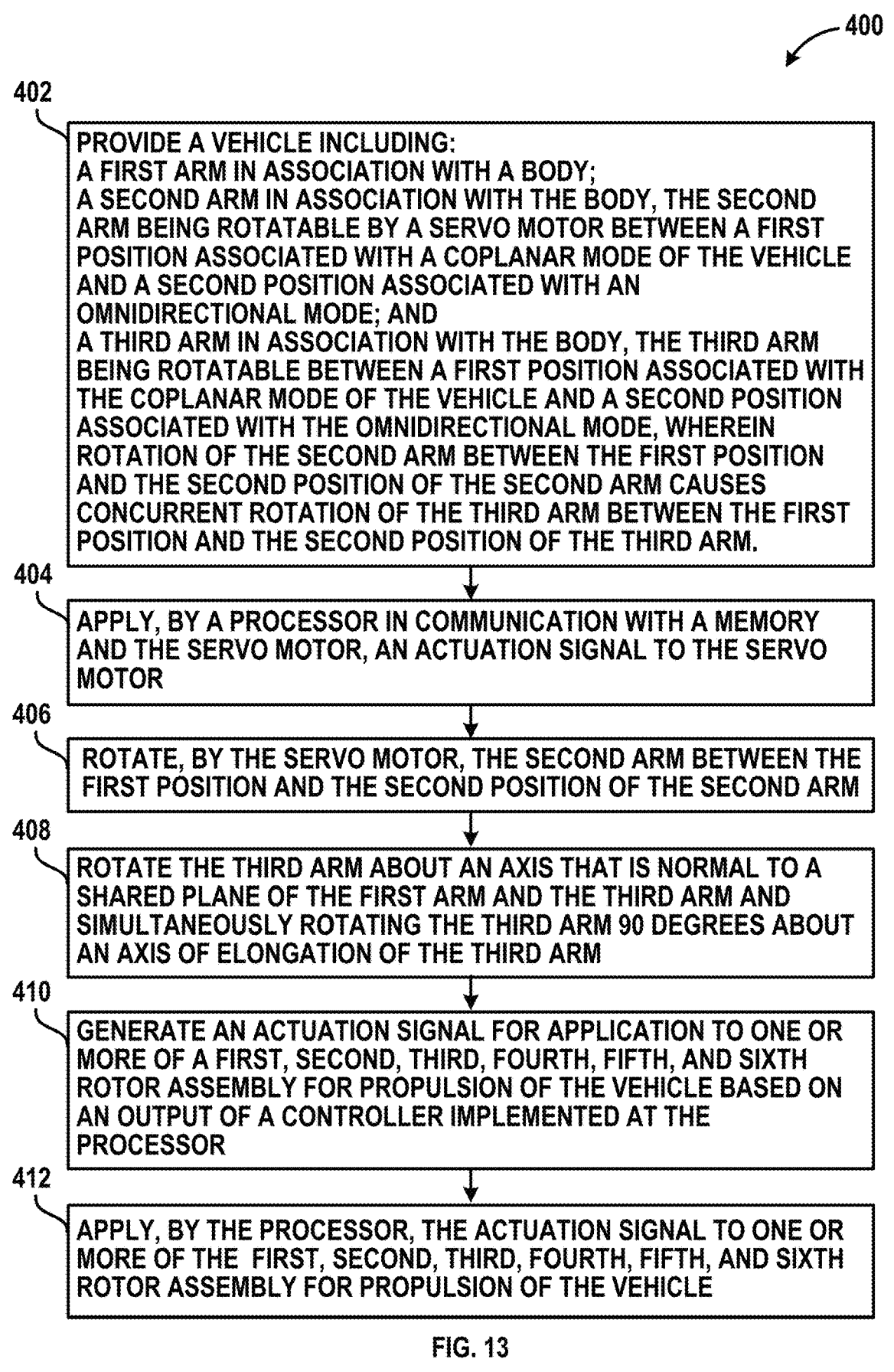

400

402 PROVIDE A VEHICLE INCLUDING:
A FIRST ARM IN ASSOCIATION WITH A BODY;
A SECOND ARM IN ASSOCIATION WITH THE BODY, THE SECOND ARM BEING ROTATABLE BY A SERVO MOTOR BETWEEN A FIRST POSITION ASSOCIATED WITH A COPLANAR MODE OF THE VEHICLE AND A SECOND POSITION ASSOCIATED WITH AN OMNIDIRECTIONAL MODE; AND
A THIRD ARM IN ASSOCIATION WITH THE BODY, THE THIRD ARM BEING ROTATABLE BETWEEN A FIRST POSITION ASSOCIATED WITH THE COPLANAR MODE OF THE VEHICLE AND A SECOND POSITION ASSOCIATED WITH THE OMNIDIRECTIONAL MODE, WHEREIN ROTATION OF THE SECOND ARM BETWEEN THE FIRST POSITION AND THE SECOND POSITION OF THE SECOND ARM CAUSES CONCURRENT ROTATION OF THE THIRD ARM BETWEEN THE FIRST POSITION AND THE SECOND POSITION OF THE THIRD ARM.

404 APPLY, BY A PROCESSOR IN COMMUNICATION WITH A MEMORY AND THE SERVO MOTOR, AN ACTUATION SIGNAL TO THE SERVO MOTOR

406 ROTATE, BY THE SERVO MOTOR, THE SECOND ARM BETWEEN THE FIRST POSITION AND THE SECOND POSITION OF THE SECOND ARM

408 ROTATE THE THIRD ARM ABOUT AN AXIS THAT IS NORMAL TO A SHARED PLANE OF THE FIRST ARM AND THE THIRD ARM AND SIMULTANEOUSLY ROTATING THE THIRD ARM 90 DEGREES ABOUT AN AXIS OF ELONGATION OF THE THIRD ARM

410 GENERATE AN ACTUATION SIGNAL FOR APPLICATION TO ONE OR MORE OF A FIRST, SECOND, THIRD, FOURTH, FIFTH, AND SIXTH ROTOR ASSEMBLY FOR PROPULSION OF THE VEHICLE BASED ON AN OUTPUT OF A CONTROLLER IMPLEMENTED AT THE PROCESSOR

412 APPLY, BY THE PROCESSOR, THE ACTUATION SIGNAL TO ONE OR MORE OF THE FIRST, SECOND, THIRD, FOURTH, FIFTH, AND SIXTH ROTOR ASSEMBLY FOR PROPULSION OF THE VEHICLE

FIG. 13

SYSTEMS AND METHODS FOR A TRANSFORMABLE UNMANNED AERIAL VEHICLE WITH COPLANAR AND OMNIDIRECTIONAL FEATURES

CROSS-REFERENCE TO RELATED APPLICATIONS

This is a continuation of U.S. patent application Ser. No. 18/335,900, filed Jun. 15, 2023, which claims benefit to U.S. Provisional Patent Application Ser. No. 63/352,551 filed 15 Jun. 2022, all of which are herein incorporated by reference in their entireties.

FIELD

The present disclosure generally relates to unmanned aerial vehicles, and in particular, to a system and associated method for a transformable unmanned aerial vehicle with both coplanar and omnidirectional Features.

BACKGROUND

Industrial and agricultural unmanned aerial vehicles (UAVs) have been widely used for long-distance flight applications such as aerial photography, mapping, package transportation, inspection, and pesticide spraying during the last several decades. Typically, coplanar multirotor UAVs, such as quadcopters and hexacopters, are applied to perform these tasks because of their carrying capacity and mechanical simplicity. These UAVs primarily work at near-hovering equilibriums with the thrust vectors limited to a single direction. The coupled translational and rotational kinematics indicate dependent position and orientation control. However, independent control of all six degrees of freedom (DOFs) for new challenges in difficult tasks, such as complex aerial movement and manipulation, may require full actuation with more actuators onboard.

Various tilted arms were added to common multirotors to achieve full even over actuation. Over-actuation could potentially enhance the overall system energy efficiency by optimizing control allocation on different actuators, which was demonstrated on ground vehicles. In some previous works, servo motors were added to rotate UAV arms independently around their main axes either radially or tangentially, and thus thrust vectors could be adjusted within certain limited angles in one plane to make the platform over-actuated. However, those platforms have low energy-efficiency issues for most movements due to internal force/torque cancellation. On the other hand, each arm of a quadcopter is typically designed to rotate in $S^2$ with two servo motors, which caused a problem of short flight time by using eight additional motors to tilt four arms. Furthermore, in one example, a coupled tiltable mechanism controlled by two servos was added to adjust directions of thrust vectors. Unlike the four-servo and the eight-servo solutions, these platforms could reduce or avoid energy dissipation issues. Due to the limitation of mechanical design and actuator constraints, although the platforms with tiltable arms increased force or energy efficiency with over-actuation, they cannot achieve omnidirectional motions.

It is with these observations in mind, among others, that various aspects of the present disclosure were conceived and developed.

BRIEF DESCRIPTION OF THE DRAWINGS

FIG. 13 is a process flow diagram showing a method associated with the vehicle of FIGS. 1A-12.

Corresponding reference characters indicate corresponding elements among the view of the drawings. The headings used in the figures do not limit the scope of the claims.

DETAILED DESCRIPTION

I. Introduction

Figure 1B:
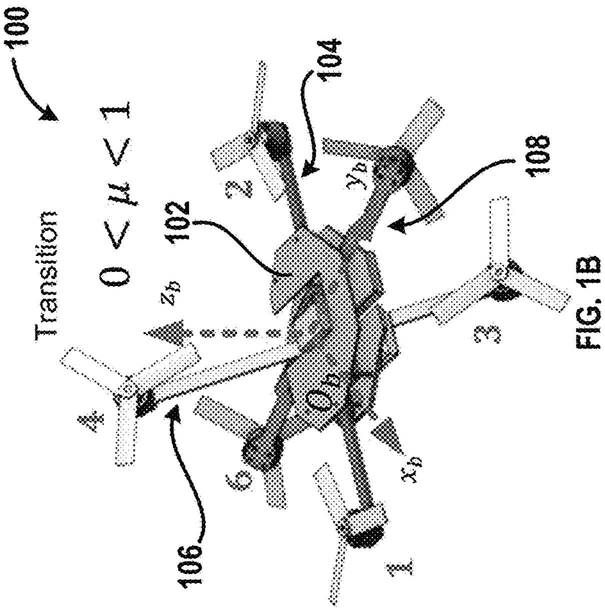
FIGS. 1A-1G are a series of illustrations showing a transformable unmanned aerial vehicle (UAV)

Omnidirectional UAVs demonstrate advantages of aerial interaction, uninhibited observation, and better capability for complex aerial manipulation missions, compared with common coplanar UAVs. Towards omnidirectional flight capability, platforms with fixed-motor configuration (and no tilt-arm servos) were developed based on optimization of static thrust and torque analysis in previous works. The force envelops must be larger than gravity in all directions with additional increments to maintain a hovering status. Hence, omnidirectional UAVs require at least six rotors allocated on at least three different planes are required. These platforms can exploit decoupled translational and rotational kinematics but suffer significant energy dissipation. By combining tiltrotor and omnidirectional fixed motor configurations, previous UAVs could hover in a given orientation while maintaining efficient flight configurations. However, these platforms are still heavy and suffer from short flight time without a power tether due to being equipped with six tilt-arm servos and twelve rotors (two on each arm with opposite direction to generate bi-directional thrusts). As such, these omnidirectional UAVs generally advance full-state flight capability but exhibit inherent limitations, such as overweight or significant energy dissipation. To achieve desired design weight and optimal energy efficiency with omnidirectional mobility, the number of the UAV actuators should be minimized.

Because coplanar UAVs typically have high energy efficiency, but with under-actuated configurations, a new trend of UAV design is to combine features of coplanar UAVs with full actuation. Although previous platforms could transit between an under-actuated coplanar mode and a fully actuated non-coplanar mode with one servo motor, which reduced energy consumption and design weight, these UAVs lacked the capability of omnidirectional motions and extended manipulation capability based on omnidirectional motions.

Motivated by the combined advantages of coplanar and omnidirectional UAVs, which can enable a broader range of applications, the present disclosure outlines a transformable UAV (hereinafter, "vehicle 100" shown in FIGS. 1A-1G) that integrates both coplanar and omnidirectional motion features. The vehicle 100 includes reversible motors with little nonlinearity influence (dead zone and delay at zero crossing) to generate bidirectional thrusts instead of dual motors placed in an opposite direction with heavier weights. Further, the vehicle 100 includes a transformation mechanism 120 (FIGS. 2A-2C and 3A-3C) that can use a single servo motor with a driving mechanism to transform the vehicle 100 between a coplanar (under-actuated) mode shown in FIG. 1A and an omnidirectional (fully-actuated) mode shown in FIG. 1C. In another aspect, the vehicle 100 can be modeled and controlled with improved mobility performance. A controller 200 of the vehicle 100 is outlined in FIGS. 6A and 6B. When the vehicle 100 is in the coplanar mode of FIG. 1A, the vehicle 100 can operate in $\mathbb{R}^{3\ 3}$ as an under-actuated hexacopter without energy dissipation. When the vehicle 100 is in the omnidirectional mode of FIG. 1C, the vehicle 100 can track a full pose trajectory in $\mathbb{R}^{3\ 3}\times SO(3)$ as a fully actuated system. As such, the vehicle 100 can arbitrarily transform for the required missions, e.g., long-range agile flight or complicated aerial manipulation.

This disclosure is structured as follows. The design and mathematical models for the vehicle 100 are introduced in Section II with reference to FIGS. 1A-5. A full-pose geometry control scheme in $\mathbb{R}^{3\ 3}\times SO(3)$ for the vehicle 100 is presented in Section III with additional reference to FIGS. 6A and 6B. Simulation results show the design validity and control performance in Section IV.

II. Modeling of the Transformable UAV

Section II.A outlines mechanical design of the vehicle 100 with reference to FIGS. 1A-3C. Section II.B introduces an actuator model and analysis of the efficiency index. Section II.C presents a rigid body model and force efficiency.

A. UAV Design

Figure 1C:
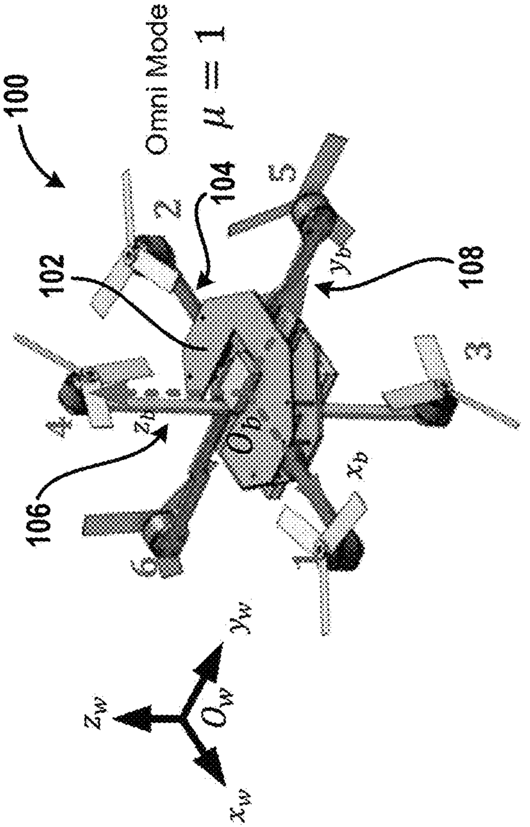
Figure 1A:
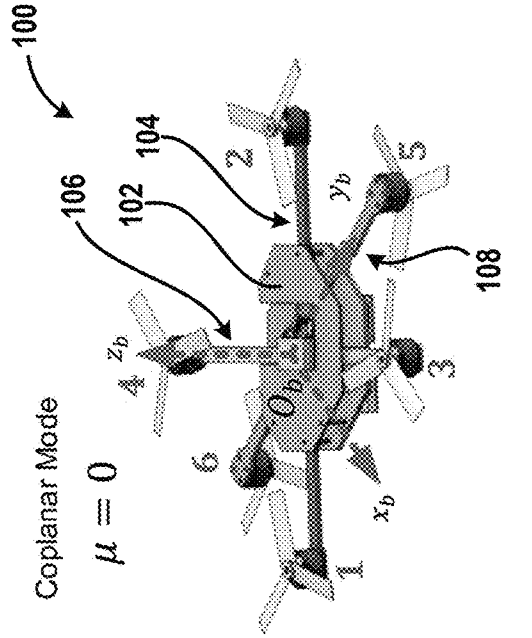

FIGS. 1A-1C respectively show the vehicle 100 in a coplanar mode, a transitional mode, and an omnidirectional mode. As shown, the vehicle 100 includes a body 102 having a first arm 104, a second arm 106, and a third arm 108 that can be actuated between the coplanar mode of FIG. 1A and the omnidirectional mode of FIG. 1C.

With additional reference to FIGS. 1D-1G, the vehicle 100 includes six reversible rotor assemblies positioned along respective free ends of the first arm 104, the second arm 106, and the third arm 108 (e.g., where the first arm 104 includes a first rotor assembly 144A and a second rotor assembly 144B, the second arm 106 includes a third rotor assembly 164A and a fourth rotor assembly 164B, and the third arm 108 includes a fifth rotor assembly 184A and a sixth rotor assembly 184B). In the coplanar mode of FIG. 1A, these rotor assemblies generate thrusts normal to a common plane shared by the first arm 104, the second arm 106, and the third arm 108. In the coplanar mode of FIG. 1A, an inertial reference frame is denoted as $\mathcal{F}_w = O_w, \{x_w, y_w, z_w\}$ and a body frame is denoted as $\mathcal{F}_b = O_b, \{x_b, y_b, z_b\}$. $O_b$ corresponds to a center of the body frame and a center of mass.

In the coplanar mode of FIG. 1A, all six rotor assemblies are positioned along the same plane, and all rotor disk (e.g., propeller) norms are parallel to the $z_b$ axis. FIG. 1A shows a first position of the second arm 106 and a first position of the third arm 108 associated with the coplanar mode. The second arm 106 and third arm 108 are coplanar with one another and with the first arm 104, with the first arm 104 and the second arm 106 being mutually perpendicular with one another and with the third arm 108 being oriented at a 45 degree angle relative to the first arm 104 and the second arm 106. Further, when in the coplanar mode of FIG. 1A, the third arm 108 can be oriented such that the fifth rotor assembly 184A and sixth rotor assembly 184B of the third arm 108 are oriented 180 degrees relative to the first rotor assembly 144A and the second rotor assembly 144B of the first arm 104 and the third rotor assembly 164A and the fourth rotor assembly 164B of the second arm 106.

During the transitional mode of FIG. 1B, the second arm 106 (with third rotor assembly 164A and fourth rotor assembly 164B, also denoted by 3, 4) and the third arm 108 (with fifth rotor assembly 184A and sixth rotor assembly 184B, also denoted by 5, 6) rotate around the center of the first arm 104 (with first rotor assembly 144A and second rotor assembly 144B, also denoted by 1, 2) with a direction change of $x_b$ (in the body frame). FIG. 1B shows transitioning the second arm 106 and the third arm 108 between the first positions associated with the coplanar mode and second positions associated with the omnidirectional mode. When in the transitional mode of FIG. 1B, the second arm 106 rotates about a fulcrum that coincides with an axis of elongation of the first arm 104 to be mutually perpendicular with the first arm 104 and parallel with the vertical axis. Simultaneously, the third arm 108 rotates about a vertical axis (e.g., normal to the plane shared by the first arm 104, second arm 106, and third arm 108 in the coplanar mode of FIG. 1A) to be mutually perpendicular with the first arm 104 and the second arm 106 while remaining coplanar with the first arm 104. During this motion, the third arm 108 also rotates about an axis of elongation of the third arm 108 such that the fifth rotor assembly 184A and sixth rotor assembly 184B of the third arm 108 are oriented 90 degrees relative to the first rotor assembly 144A and the second rotor assembly 144B of the first arm 104.

In the omnidirectional mode of FIG. 1C, the six rotor assemblies are located at the vertices of a regular octahedron. FIG. 1C shows a second position of the second arm 106 and a second position of the third arm 108 associated with the omnidirectional mode. As shown, the second arm 106 is parallel with a vertical axis and is mutually perpendicular with the first arm 104 and the third arm 108. The third rotor assembly 164A and the fourth rotor assembly 164B of the second arm 106 are shown having been rotated 90 degrees about an axis of elongation of the first arm 104 to a position that is mutually perpendicular with the first rotor assembly 144A and the second rotor assembly 144B of the first arm 104 and the fifth rotor assembly 184A and sixth rotor assembly 184B of the third arm 108. Further, in the omnidirectional mode of FIG. 1C, the third arm 108 is mutually perpendicular with the first arm 104 and the second arm 106 and coplanar with the first arm 104. Note that the first arm 104 does not necessarily rotate independently from the body 102, and the third arm 108 rotates to form a 90 degree angle with the first arm 104. In this mode, the third arm 108 has also been rotated 90 degrees about an axis of elongation of the third arm 108 such that the fifth rotor assembly 184A and sixth rotor assembly 184B of the third arm 108 are mutually perpendicular with the first rotor assembly 144A and the second rotor assembly 144B of the first arm 104 and the third rotor assembly 164A and the fourth rotor assembly 164B of the second arm 106.

Figure 1D:
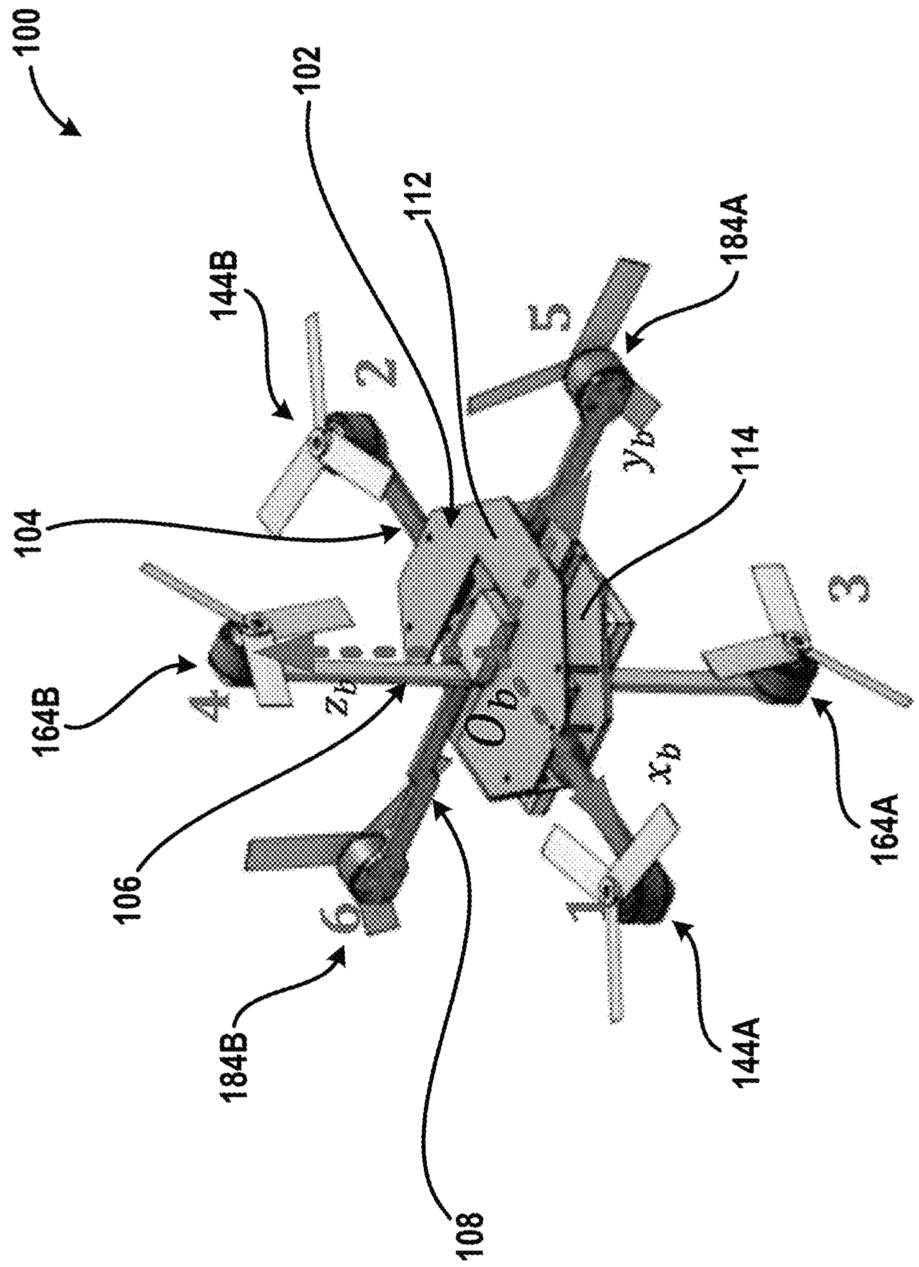
Figure 1E:
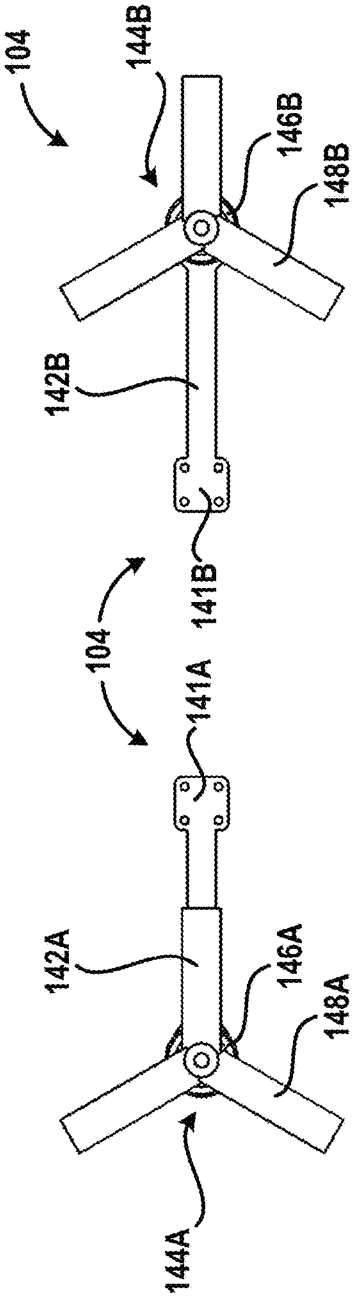
Figure 1F:
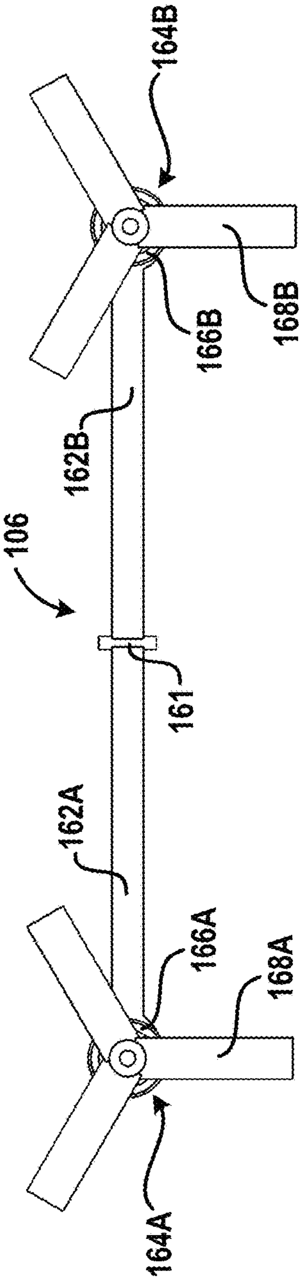
Figure 1G:
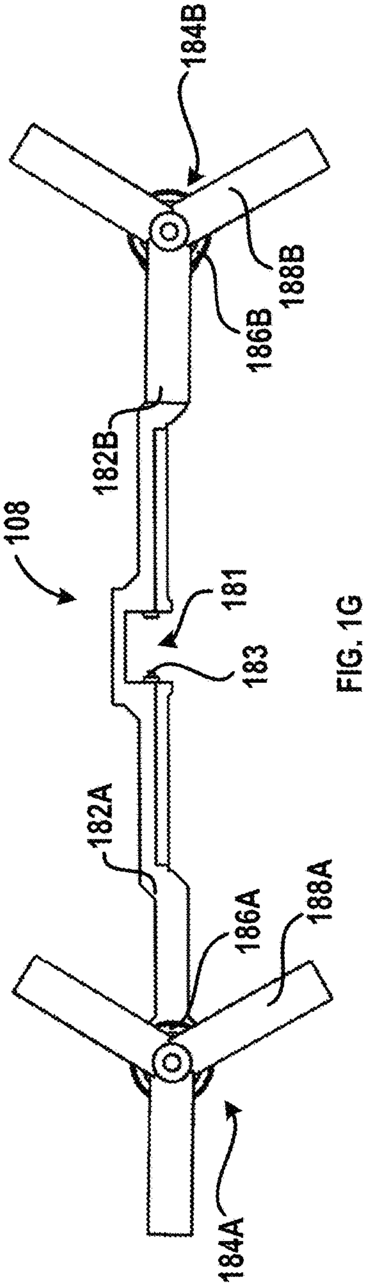

FIG. 1D also shows a top plate 112 and a bottom plate 114 of the body 102. FIGS. 1E-1G respectively show the first arm 104, the second arm 106 and the third arm 108.

As shown in FIG. 1E, the first arm 104 (which does not need to rotate between the coplanar mode of FIG. 1A and the omnidirectional mode of FIG. 1C) includes a first portion 142A associated with the first rotor assembly 144A and a second portion 142B associated with the second rotor assembly 144B. The first portion 142A can include a first connection point 141A and the second portion 142B can include a second connection point 141B that couple with the body 102 of the vehicle 100. Further, the first rotor assembly 144A is shown having a first motor 146A in operative association with a first propeller 148A. Likewise, the second rotor assembly 144B is shown having a second motor 146B in operative association with a second propeller 148B.

As shown in FIG. 1F, the second arm 106 (which needs to pivot as shown between the coplanar mode of FIG. 1A and the omnidirectional mode of FIG. 1C) includes a first portion 162A associated with the third rotor assembly 164A and a second portion 162B associated with the fourth rotor assembly 164B. The first portion 162A and the second portion 162B can be linked at a fulcrum 161 that couples with the transformation mechanism 120 of the vehicle 100 as discussed further herein. The third rotor assembly 164A is shown having a third motor 166A in operative association with a third propeller 168A. Likewise, the fourth rotor assembly 164B is shown having a fourth motor 166B in operative association with a fourth propeller 168B.

As shown in FIG. 1G, the third arm 108 (which needs to rotate about a direction of elongation of the third arm 108 as shown between the coplanar mode of FIG. 1A and the omnidirectional mode of FIG. 1C) includes a first portion 182A associated with the fifth rotor assembly 184A and a second portion 182B associated with the sixth rotor assembly 184B. The first portion 182A and the second portion 182B can be linked at a receptacle 181 having a pivot point 183 that receives part of the transformation mechanism 120 of the vehicle 100 as discussed further herein. The fifth rotor assembly 184A is shown having a fifth motor 186A in operative association with a fifth propeller 188A. Likewise, the sixth rotor assembly 184B is shown having a sixth motor 186B in operative association with a sixth propeller 188B.

The three canonical rotation matrices in SO(3) are denoted with $R_x$, $R_y$ and $R_z$, and the operating mode of the transformable UAV with $\mu \in [0, 1]$. $\mu=0$ is defined for the coplanar mode of FIG. 1A, $\mu \in (0, 1)$ for the transition state of FIG. 1B, and $\mu=1$ for the omnidirectional mode of FIG. 1C. The position and disk normal of all six motors are given by:

$$P = [R_1(\mu)p_{1,0}\ R_2(\mu)p_{2,0} \ldots\ R_6(\mu)p_{6,0}] \tag{1}$$

$$N = [R_1(\mu)n_{1,0}\ \ R_2(\mu)n_{2,0}\ \ldots R_6(\mu)n_{6,0}]$$

$$p_{1,0} = -p_{2,0} = \left[\frac{\sqrt{2}}{2}l - \frac{\sqrt{2}}{2}l\ 0\right]^T$$

-continued $$p_{3,0} = -p_{4,0} = \left[\frac{\sqrt{2}}{2}l - \frac{\sqrt{2}}{2}l\ 0\right]^T,$$

$$p_{5,0} = -p_{6,0}[0\ l\ 0]^T$$

$$n_{1,0} = n_{2,0} = n_{3,0} = n_{4,0} = [0\ 0\ 1]^T$$

$$n_{5,0} = n_{6,0} = (0\ 0\ -1)^T$$

where $p_{i,0}$ (i=1, . . . , 6) is the rotor position relative to the UAV geometric center in the coplanar mode. Each rotor has the same distance from the geometric center. In the coplanar mode of FIG. 1A, the first arm 104 and the second arm 106 are coplanar and mutually perpendicular with one another. The third arm 108 is coplanar with the first arm 104 and the second arm 106, and is also oriented at a 45-degree angle relative to the first arm 104 and the second arm 106. The third arm 108 coincides $y_b$ in the coplanar mode of FIG. 1A. The 45 degrees and 90 degrees are intentionally selected as the arm intersection angles for a direct and simple mechanical transformation towards the omni-mode of FIG. 1C. Furthermore, $n_{i,0}$ (i=1, . . . , 6) are disk normal of six rotors (e.g., of the six rotor assemblies shown in FIG. 1D) in the coplanar mode of FIG. 1A. Let $p_{i,0}=R_i p_{i,0}$ and $n_{i,0}=R_i n_{i,0}$. Then the rotation transition expression of each rotor assembly $R_{i,0}$ (i=1, . . . , 6) is given by:

$$\begin{cases} R_1(\mu) = R_2(\mu) = R_z\left(\mu\frac{\pi}{4}\right) \\ R_3(\mu) = R_4(\mu) = R_x\left(\mu\frac{\pi}{2}\right)R_z\left(\mu\frac{\pi}{4}\right). \\ R_5(\mu) = R_6(\mu) = R_y\left(\mu\frac{\pi}{2}\right) \end{cases} \tag{2}$$

Figure 2A:
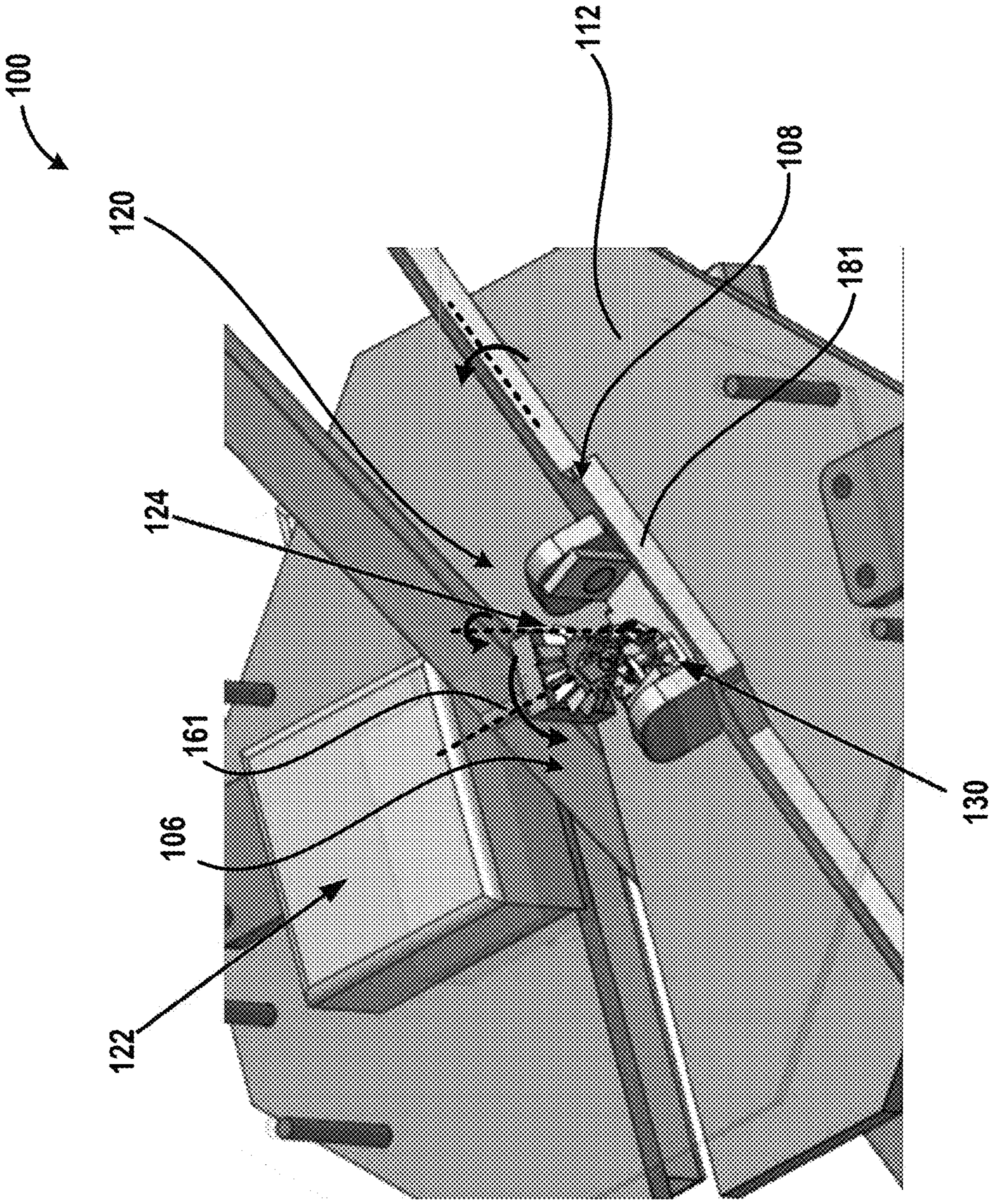
FIGS. 2A-2C are illustrations showing a transformation mechanism of the vehicle of FIGS. 1A-1G.

The transformation mechanism 120 of the vehicle 100 is shown in FIGS. 2A-3C that transitions the second arm 106 between the first position associated with the coplanar mode and the second position associated with the omnidirectional mode and simultaneously transitions the third arm 108 between the first position associated with the coplanar mode and the second position associated with the omnidirectional mode. To transform from the coplanar mode to the omnidirectional mode, the second arm 106 needs to rotate 90 degrees about the fulcrum 161. Concurrently, the third arm 108 needs to rotate 90 degrees about a direction of elongation of the third arm 108. The transformation mechanism 120 facilitates this motion. As shown in FIGS. 2A-2C, the transformation mechanism 120 includes a servo motor 122 that couples with and directly rotates the second arm 106 about the fulcrum 161 (which can be coaxial with an axis of elongation of the first arm 104) between the first position and the second position as shown. The servo motor 122 can rotate the second arm 106 upon receipt of an actuation signal from a computing device 300 (FIG. 6A) of the vehicle 100.

Figure 2C:
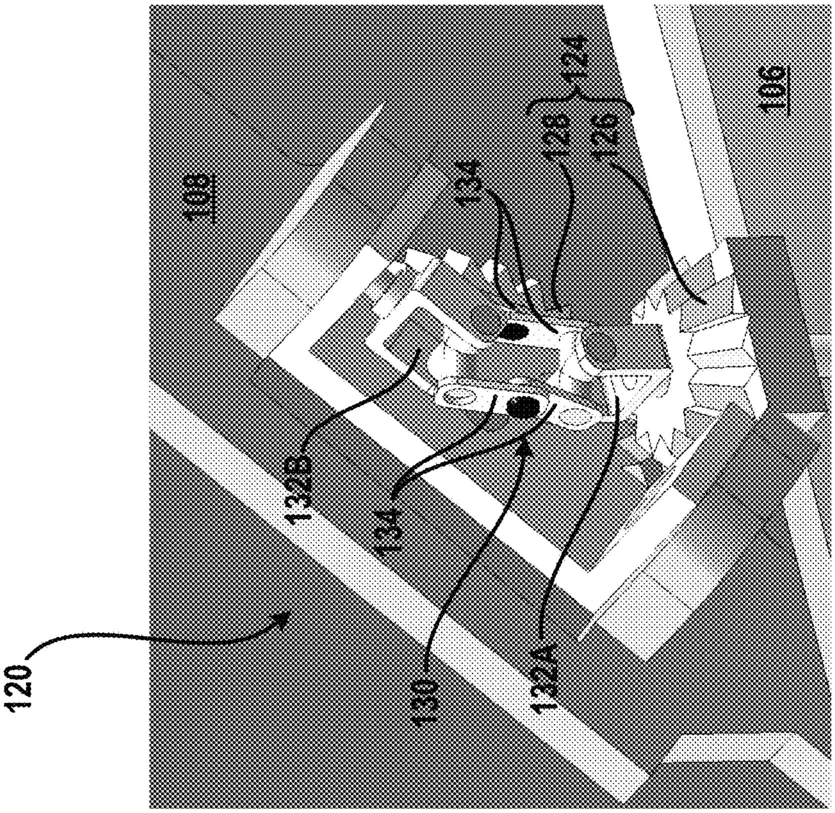
Figure 2B:
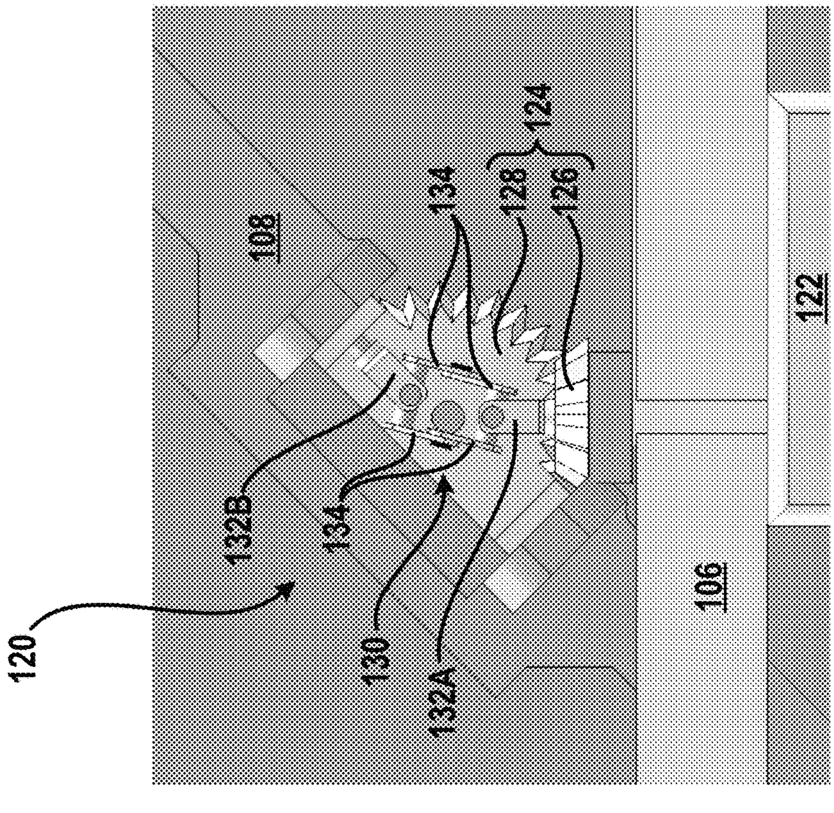

The transformation mechanism 120 further includes a helical gear set 124, including a first helical gear component 126 that couples and rotates with the second arm 106 at the fulcrum 161 and a second helical gear component 128 that couples with the receptacle 181 of the third arm 108. The transformation mechanism 120 includes a linkage assembly 130 that allows rotation of the third arm 108 about an axis of elongation of the third arm 108 concurrently with rotation of the second arm 106 about the fulcrum 161. The linkage assembly 130 can include a first joint component 132A that extends from the second arm 106 at the first helical gear component 126 as shown, and a second joint component 132B that connects with the pivot point 183 of the third arm 108. The first joint component 132A connects with the second joint component 132B by linkages 134 as shown in FIGS. 2B and 2C.

The first helical gear component 126 can be a beveled helical gear that engages with the second helical gear component 128, which in turn rotates perpendicular to and concurrently with the first helical gear component 126 as shown. The second helical gear component 128 is positioned within the receptacle 181 of the third arm 108 and engages the pivot point 183 to connect the second arm 106 with the third arm 108. The second helical gear component 128 includes a gear portion that engages the first helical gear component 126, and rotates the third arm 108 about a vertical axis that is normal to the "shared" plane of the first arm 104, the second arm 106 and the third arm 108 associated with the coplanar mode. This rotation causes the third arm 108 to transition between the first position and the second position (e.g., rotating the third arm 108 by 45 degrees in a first direction to become mutually perpendicular with the first arm 104 when transitioning the third arm 108 from the first position to the second position, or rotating the third arm 108 by 45 degrees in a second direction to transition the third arm 108 from the second position to the first position). Simultaneously, the linkage assembly 130 allows concurrent rotation of the third arm 108 by 90 degrees about the axis of elongation of the third arm 108 between the first position and the second position of the third arm 108 as the second arm 106 rotates about the fulcrum 161 between the first position and the second position of the second arm 106.

Figures 3A, 3B, 3C:
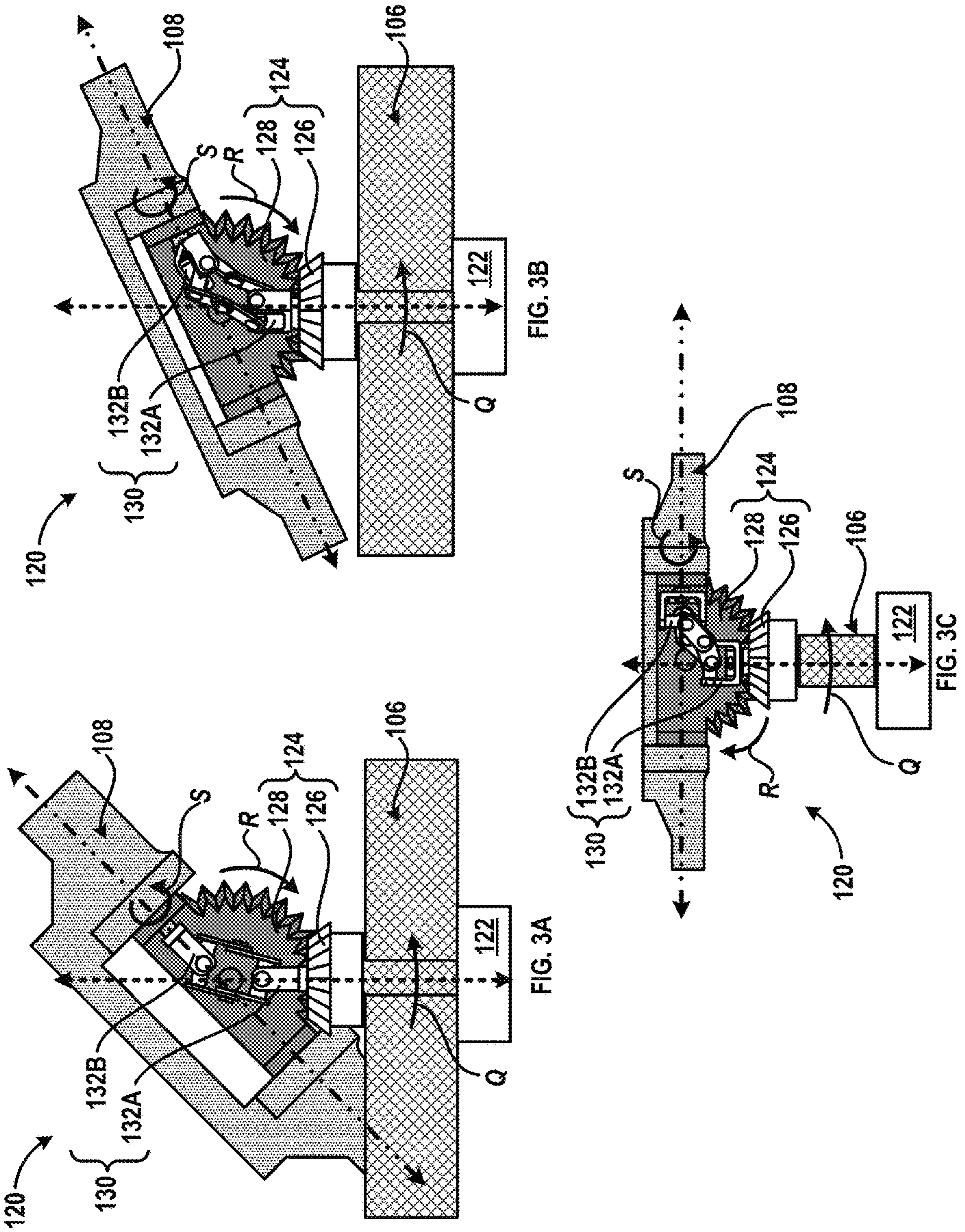
FIGS. 3A-3C are a series of illustrations showing the transformation mechanism of the vehicle of FIGS. 1A-1C between a coplanar mode and an omnidirectional mode of the vehicle.

FIGS. 3A-3C show an example sequence of the transformation mechanism 120 between the coplanar mode (FIG. 3A) and omnidirectional mode (FIG. 3C) corresponding to FIGS. 1A-1C with the transitional mode (FIG. 3B) therebetween. As the servo motor 122 rotates the second arm 106 in a first rotational direction Q about the fulcrum 161, the first helical gear component 126 and first joint component 132A similarly rotate about the fulcrum 161 in the first rotational direction Q. Rotation of the first helical gear component 126 causes the second helical gear component 128 and third arm 108 to rotate in the second rotational direction R about a (vertical) axis that is normal to a plane shared by the first arm 104 and the third arm 108 as shown. Simultaneously, rotation of the first joint component 132A causes the second joint component 132B and the third arm 108 to rotate in a third rotational direction S about the axis of elongation of the third arm 108. While the examples shown in FIGS. 3A-3C show transitioning from the coplanar mode to the omnidirectional mode with rotational directions Q, R and S, the sequence and rotational directions can be reversed to transition from the omnidirectional mode to the coplanar mode.

During the transition, the angle between the heading axis $x_b$ and the first arm 104 varies from 0 to 45 degree. A swift transition will be limited to avoid introducing unnecessary disturbances, and further discussions are given in subsections B and C. The transition time is designed within two seconds. The vehicle 100 will operate in either the coplanar or the omnidirectional mode.

B. Actuator Model & Efficiency Analysis

Most UAVs use unreversible motors plus ESCs, in which one single rotor thrust is constrained to:

$$0 < f_{rotor,min} \leq f_{rotor} \leq f_{rotor,max}. \tag{3}$$

To generate a bi-directional thrust, two motors are placed in an opposite direction in some omnidirectional design, which causes large weight and energy loss. To overcome this issue, each rotor assembly (e.g., discussed above with reference to FIGS. 1E-1G) of the vehicle 100 includes well-designed reversible motors with symmetric propellers, giving one single rotor-propeller thrust constrained to:

$$-f_{rotor,max} = f_{rotor,min} \leq f_{rotor} \leq f_{rotor,max}. \tag{4}$$

The dead zone effect can be ignored since $\min(|f_{rotor}|)$ <0.01N. With reversible motors, symmetric propellers, and suitable total weight, the omnidirectional flight of the vehicle 100 is achievable with two motors supplying most of the thrust to overcome the gravity. The thrust rotor and inverse torque rotor of each rotor are introduced and simplified as:

$$\begin{aligned} f_{rotor,i} &= \mathrm{sgn}(\omega_i) k_f \omega_i^2 \\ \tau_{rotor,i} &= k_{\tau-f} f_{rotor,i} \end{aligned} \quad i = 1, 2 \ldots 6. \tag{5}$$

where ω is the rotor speed, and $k_f$ and $k_{\tau\text{-}f}$ are aerodynamic factors of the rotors and the surrounding air, respectively. To simplify the actuator dynamics, the transfer function between the desired thrust $f_{rotor,des}$ and actual thrust $f_{rotor}$ can be modeled as a first-order low-pass filter.

$$f_{rotor} = \frac{a}{s+a} f_{rotor,des}. \tag{6}$$

The total thrust $F_{3\times1}$ and torque $T_{3\times1}$ is given by:

$$\begin{bmatrix} F \\ T \end{bmatrix} = \begin{bmatrix} N \\ P \times N \end{bmatrix} f_{rotor} + \begin{bmatrix} O_{3\times6} \\ N_\tau \end{bmatrix} \tau_{rotor}. \tag{7}$$

Here thrust $f_{rotor}=[f_{rotor,1}, f_{rotor,2}, \ldots, f_{rotor,6}]^T$, inverse torque $\tau_{rotor}=[\tau_{rotor,1}, \tau_{rotor,2}, \ldots, \tau_{rotor,6}]^T$ and the i-th column of P×N is $p_i \times n_i$ based on (1). $N_T=[-n_1, n_2, n_3, -n_4, n_5, -n_6]$ which denotes the motor direction allocation for yaw motion in coplanar mode. Substituting (5) into (7), force and torque expressions in (7) can be rewritten as:

$$\begin{bmatrix} F \\ T \end{bmatrix} = \begin{bmatrix} N \\ P \times N + k_{\tau-f} N_\tau \end{bmatrix} f_{rotor} = A f_{rotor}. \tag{8}$$

For different μ that correspond to different modes or transition:

$$\begin{aligned} \mu = 0 &\Rightarrow \mathrm{rank}(A(\mu)) = 4, F = (0 \;\; 0 \;\; F_z)^T \\ \mu \in (0, 1] &\Rightarrow \mathrm{rank}(A(\mu)) = 6, F = [F_x \;\; F_y \;\; F_z]^T \end{aligned}. \tag{9}$$

Figure 4:
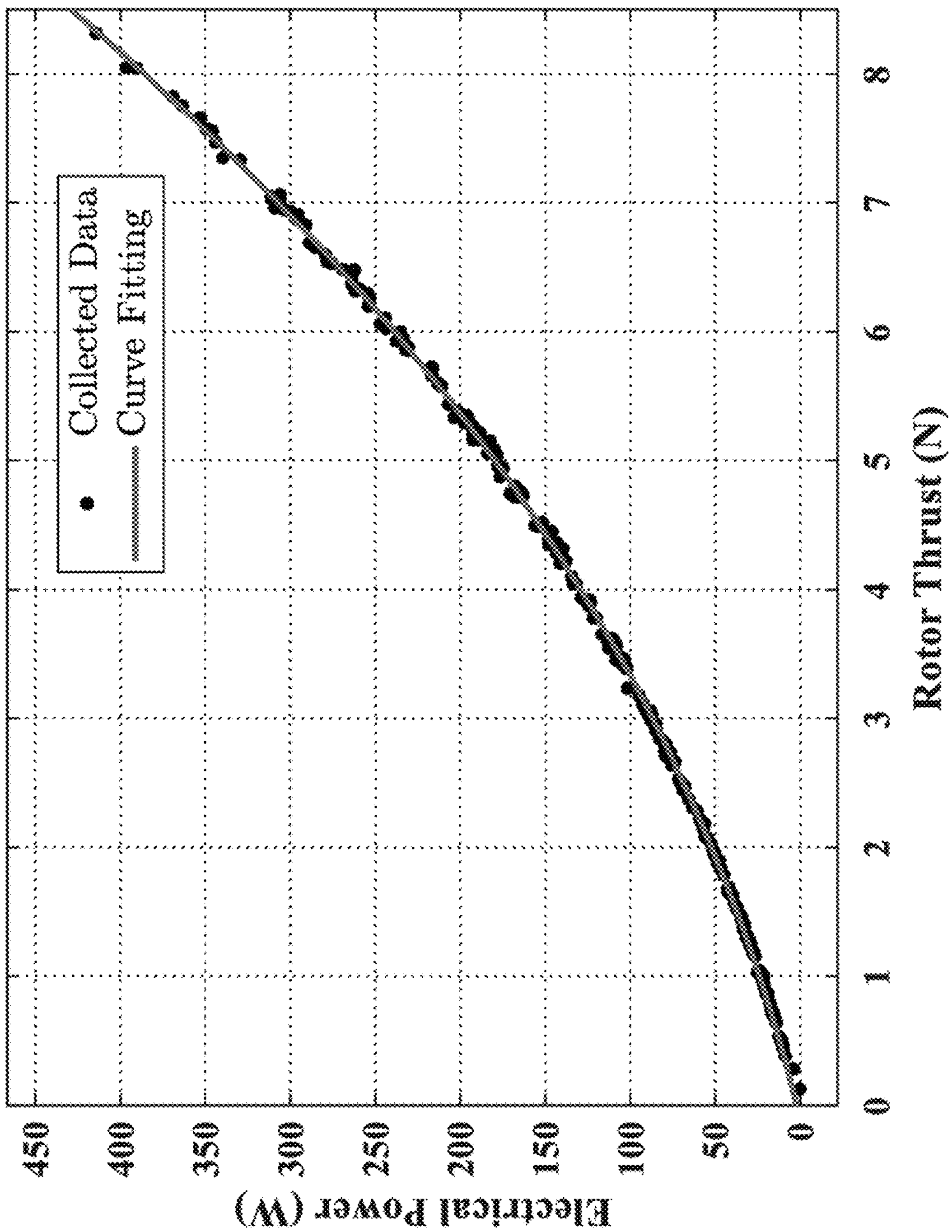
FIG. 4 is a graphical representation showing an empirical model of motor electrical power vs. thrust.

After the actuators are modeled, the rotor electrical power consumption is evaluated. An experiment using a reversible motor with a 5045 symmetric propeller was conducted. The rotor thrust vs. electrical power curve fitting is shown in FIG. 4. A cubic polynomial model was developed in (10).

$$\begin{aligned} P_{rotor} &= k_{p1} f_{rotor}^3 + k_{p2} f_{rotor}^2 + k_{p3} f_{rotor} + k_{p4} \\ k_{p1} &= -3.736 \cdot 10^{-4},\ k_{p2} = 3.004 \\ k_{p3} &= 17.56,\ k_{p4} = 2.026 \end{aligned} \quad . \tag{10}$$

It is worth noting that $\dot{P}_{rotor}>0$ for any reasonable $f_{rotor} \leq 0$. Thus, more energy will be cost if fewer actuators are selected to generate the same total thrust, which indicates the omni-mode costs more power than the coplanar mode at hovering.

In the coplanar mode, disk norms of six rotors are all collinear. The vehicle 100 works as an underactuated hexacopter with internal forces equal to zero during hovering. Yaw movement relies on the drag moment of each rotor. The vehicle 100 is fully actuated with internal forces determined by the current hovering orientation and transition state in the transition and omnidirectional mode. The force efficiency index is:

$$\gamma(\mu, f_{rotor}) = \frac{\|F\|}{\sum_{i=1}^{6} |f_{rotor,i}|} \in [0, 1]. \tag{11}$$

Clearly, $\gamma(\mu=0, f_{rotor})=1$ corresponds to the maximum force or energy efficiency.

Figure 5:
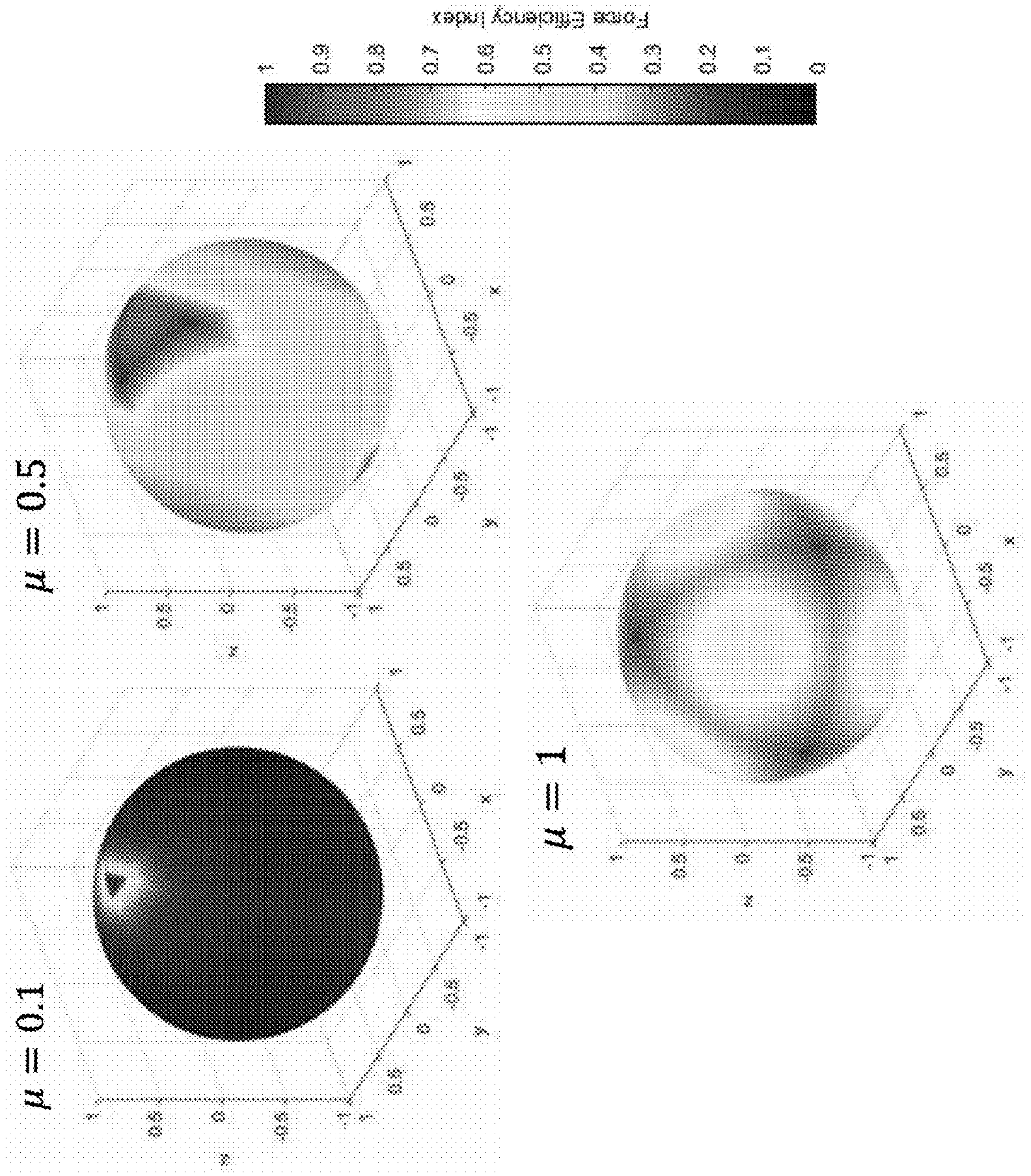
FIG. 5 is a graphical representation showing a force efficiency index map for μ531 (0, 1)

The thrust vector coincides $z_b$ without any remnant in $x_b$ and $y_b$ directions. Hence, the vehicle 100 has four controllable degrees of freedom (3D position plus yaw angle). The force index maps corresponding to different $\mu \in (0,1]$ are shown in FIG. 5. The vehicle 100 is fully actuated but can only enter the omnidirectional mode after the transformation. All three subplots have $\gamma=1$ at $z_b$ in the positive direction. When $\mu$ is small, most of the efficiency index map is smaller than 0.5. Two main points are discussed as follows. 1) The vehicle 100 should not generate any force in the direction of $x_b$ and $y_b$ as the efficiency index is too low. The vehicle 100 needs to maintain low speed in transition and adds saturation on control inputs of rotors 3-6 at the early stage of transition. 2) To enter the omnidirectional mode or vice versa, the transition time is smooth enough to avoid unnecessary mechanical disturbances. As $\mu$ increases, the overall efficiency index keeps increasing. When $\mu=1$, the vehicle 100 fully enters the omnidirectional mode. The efficiency index is between 57.7% and 100%. It reaches 100% (no internal forces) at each axis, corresponding to the maximum power efficiency matching six sets of roll-pitch angles during flight. Such orientations should be applied during hovering to maximize the flight time in the omni-mode.

C. Rigid Body Model

The rigid body kinematic model of the vehicle 100 is derived by considering the aerodynamic effects (interference) between rotors as disturbances. The inertial frame and the body frame are defined in subsection A. The translational dynamics of the vehicle 100 are described by the position $p=[p_x\ p_y\ p_z]^T$ and the velocity $v=[v_x\ v_y\ v_z]^T$. $g=[0\ 0\ g]^T$ is the gravity vector, and F, T are defined in (8). Based on, R is the rotation matrix maps from the body frame to the inertial frame, and $\omega=[\omega_x\ \omega_y,\ \omega_z]^T$ denotes the vehicle body angular velocity with the $\wedge$ operator converting $\omega$ into $\omega_\wedge$. Then the translational (force) and rotational (torque) aerodynamic drag equations are denoted as:

$$F_v = \begin{bmatrix} \mathrm{sgn}(v_x) C_v v_x^2 \\ \mathrm{sgn}(v_y) C_v v_y^2 \\ \mathrm{sgn}(v_z) C_v v_z^2 \end{bmatrix}, \quad \tau_\omega = \begin{bmatrix} \mathrm{sgn}(\omega_x) C_\omega \omega_x^2 \\ \mathrm{sgn}(\omega_y) C_\omega \omega_y^2 \\ \mathrm{sgn}(\omega_z) C_\omega \omega_z^2 \end{bmatrix}. \tag{12}$$

$C_v$, $C_\omega$ are drag coefficients. $\tau_s$ represents the inverse torque generated from the mechanical structure in transition. The center of gravity is not essentially changed since the transformation mechanism 120 is located in the center of the body 102, and all modules are placed symmetrically. Summing all torque and thrust contributions and using the Newton-Euler approach, the equation of motion of the vehicle 100 is expressed as:

$$\begin{cases} \dot{p} = v \\ m\dot{v} = -mg + RF - F_v \\ \dot{R} = R\omega_\wedge = R \begin{bmatrix} 0 & -\omega_z & \omega_y \\ \omega_z & 0 & -\omega_x \\ -\omega_y & \omega_x & 0 \end{bmatrix}, \\ J\dot{\omega} = -\omega \times J\omega + T - \tau_\omega - \tau_s \end{cases} \tag{13}$$

where m is the mass of the vehicle 100 and J is the 3×3 inertia tensor matrix. Then $J_{arm\ 3\text{-}4}$, $J_{arm\ 5\text{-}6}$, $J_{rest}$ and rest are the inertia tensor matrices of the green arm, blue arm, and the rest of the body parts, respectively. $J_{arm\ 3\text{-}4,0}$, $J_{arm\ 5\text{-}6,0}+J_{rest,0}$, are inertia tensor matrices of all these body parts when $\mu=0$. Thus:

$$\begin{aligned} J &= J_{arm3-4} + J_{arm5-6} + J_{rest} \\ J_{arm3-4} &= R_x\left(\mu\frac{\pi}{2}\right) R_z\left(\mu\frac{\pi}{4}\right) J_{arm3-4,0} \\ J_{arm5-6} &= R_y\left(\mu\frac{\pi}{2}\right) J_{arm5-6,0} \\ J_{rest} &= R_z\left(\mu\frac{\pi}{4}\right) J_{rest,0} \\ \tau_s &= \left( J_{arm3-4} R_z\left(\mu\frac{\pi}{4}\right) \begin{bmatrix} \frac{\pi}{2} \\ 0 \\ 0 \end{bmatrix} + J_{arm5-6} \begin{bmatrix} 0 \\ \frac{\pi}{2} \\ 0 \end{bmatrix} \right) \dot{\mu} \end{aligned} \quad . \tag{14}$$

Based on (8) and (13), the equation of acceleration and rotation can be compactly rewritten as:

$$\begin{aligned} \begin{bmatrix} m\ddot{p} \\ J\dot{\omega} \end{bmatrix} &= -\begin{bmatrix} mg + F_v \\ \omega \times J\omega + \tau_\omega + \tau_s \end{bmatrix} + Bf_{rotor} \\ B &= \begin{bmatrix} RN \\ P \times N + k_{T-f} N_T \end{bmatrix} \end{aligned} , \tag{15}$$

where B has the same rank as A. Unlike prior works, the vehicle 100 performs tasks either as a coplanar underactuated hexacopter or as an omnidirectional multirotor with rotors located at the vertices of a regular octahedron.

III. Control Design

Figure 6A:
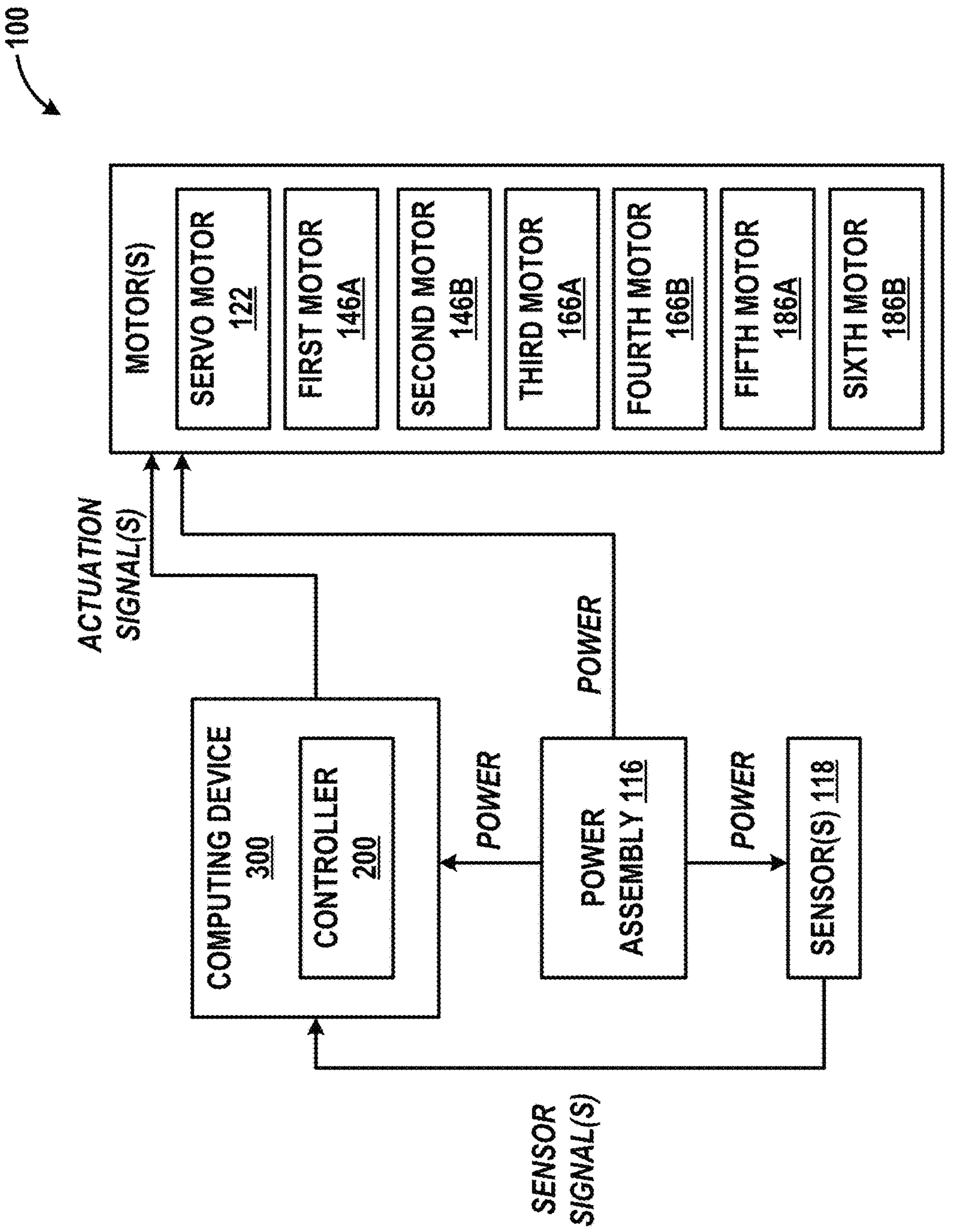
FIGS. 6A and 6B are a pair of simplified block diagrams showing a control architecture and application of actuation signals to various electromechanical components of the vehicle of FIGS. 1A-1G.
Figure 6B:
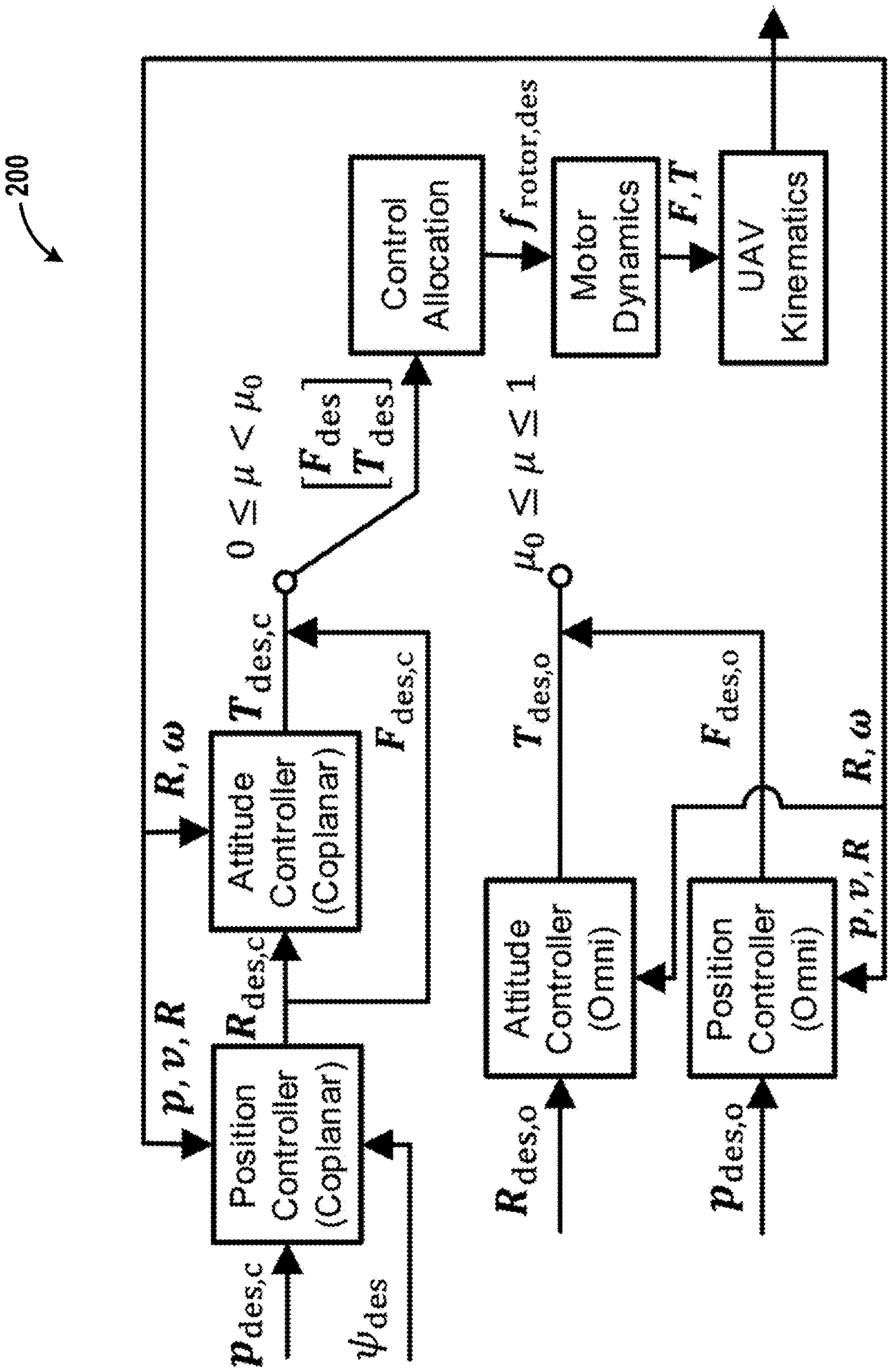

In this section, a switching control structure on SO(3) is introduced for the vehicle 100 in Section II. FIGS. 6A and 6B show electrical components including a control architecture of a controller 200 of the vehicle 100.

As shown in FIG. 6A, the vehicle 100 can include a computing device 300 that implements functionalities of the controller 200, including applying actuation signals to various motors of the vehicle 100. These motors include: the servo motor 122 of the transformation mechanism 120, the first motor 146A of the first rotor assembly 144A, the second motor 146B of the second rotor assembly 144B, the third motor 166A of the third rotor assembly 164A, the fourth motor 166B of the fourth rotor assembly 164B, the fifth motor 186A of the fifth rotor assembly 184A, and the sixth motor 186B of the sixth rotor assembly 184B. In particular, the computing device 300 can apply actuation signal(s) to the servo motor 122 to transition the second arm 106 between the first position and the second position of the second arm 106, which causes the third arm 108 to concurrently transition between the first position and the second position of the third arm 108. The computing device 300 can also apply actuation signal(s) to one or more of the first rotor assembly 144A, the second rotor assembly 144B, the third rotor assembly 164A, the fourth rotor assembly 164B, the fifth rotor assembly 184A, and the sixth rotor assembly 184B for propulsion and steering of the vehicle. In some examples, the vehicle 100 can include one or more sensor(s) 118 for data capture as well as position and attitude control. Examples include, but not limited to, an inertial measurement unit, an accelerometer, a global positioning system, a UDAR unit, and/or an image capture device. FIG. 6A also shows a power assembly 116 that can be coupled along the vehicle 100 and can include power source(s), connection elements, and other components that provide and/or regulate power delivery to the motors, computing device 300, and sensor(s) 118.

FIG. 6B shows a control architecture of the controller 200 for implementation of various functionalities of the vehicle 100. The controller 200 includes a position controller and an attitude controller, and each have different characterizations depending on the mode of the vehicle 100 (e.g., coplanar mode or omnidirectional mode).

To avoid low force efficiency along x, y axis as $\mu \leq 0.5$, the controller switching is performed at $\mu = \mu_0 > 0.5$. In the coplanar mode, translational and rotational dynamics are coupled. Heading direction (yaw angle) and position tracking are achieved in a coupled loop. First, the position controller of the controller 200 calculates desired rotation matrix and a total thrust at $z_b$. The attitude controller of the controller 200 subsequently outputs desired torques. Finally, the rotor thrust is chosen. In the transition state and omnidirectional mode, translational and rotational dynamics are decoupled, and hence the orientation and position are tracked in two separate loops, in one example implementation, the position controller and attitude controller of the controller 200 are designed with cascade PI/PD architecture.

A. Attitude Control

Assume the measurements are well filtered, and the attitude controller has a high sampling frequency. The attitude controller has a high sampling frequency. The attitude controller is designed with a cascade geometric structure on SO(3) which gives a smooth movement trajectory to track. The inner loop uses w as feedback to compute the reference torque based on feedback linearization as:

$$T_{des} = -J(k_{p,\omega}e_\omega + k_{d,\omega}\dot{e}_\omega) + \omega \times J\omega, \tag{16}$$

which denotes a Proportional-Derivative (PD) controller to deal with dynamics of angular velocity acting like a first-order system brought by motor dynamics in the actuator model. $k_{p,\omega}$, $k_{d,\omega}$ are positive gain matrices and $e_\omega$ is the angular rate error which is defined as $$\begin{cases} e_\omega = \omega - \omega_{des} \\ \dot{e}_\omega = \dot{\omega} - \dot{\omega}_{des} \end{cases}. \tag{17}$$

The reference angular velocity is chosen as $$\omega_{des} = -k_{p,R}e_R - k_{i,R}\int e_R, \tag{18}$$

which is a proportional-integral (PI) controller. $k_{p,R}$, $k_{i,R}$ are positive gain matrices, and $e_R$ is the orientation tracking error on SO(3) defined as $$e_R = \frac{1}{2}(R_{des}^T R - R^T R_{des})^\vee. \tag{19}$$

$\vee$ is the inverse operator of $\wedge$ in Eqn. (13). This attitude controller has the same structure in both working modes (coplanar/omnidirectional). The geometric control law gives exponential stability when the attitude tracking error should be less than 180°. A low pass prefilter is added to the global attractiveness command signal.

Importantly, based on an output of the attitude controller of the controller 200 (e.g., implemented by the computing device 300), the computing device 300 generates and applies actuation signals for application to one or more of the first rotor assembly 144A, the second rotor assembly 144B, the third rotor assembly 164A, the fourth rotor assembly 164B, the fifth rotor assembly 184A, and the sixth rotor assembly 184B for propulsion and steering of the vehicle.

B. Position Control

Similar to attitude controllers, the position controller of the controller 200 can be designed with a cascade structure. In coplanar mode, the position controller takes the yaw angle $\psi_{des}$ and $p_{des}$ as the reference trajectory. In the omnidirectional mode, the position controller takes $R_{des}$ and $p_{des}$ (full pose) as the reference trajectory. In both modes, the outer loop is defined as:

$$e_p = p - p_{des}, \tag{20}$$

and proportional control is used to get the desired velocity:

$$v_{des} = -k_{p,p}e_p - k_{i,p}\int e_p. \tag{21}$$

The velocity tracking error is defined as $$\begin{cases} e_v = v - v_{des} \\ \dot{e}_v = \dot{v} - \dot{v}_{des} \end{cases}. \tag{22}$$

The desired force vector in the inertial frame is defined as $$F_{des,w} = mg - (k_{p,v}e_v + k_{d,v}\dot{e}_v), \tag{23}$$

which needs to be converted to the body frame. $k_{p,p}$, $k_{i,p}$, $k_{p,v}$ and $k_{d,v}$ are all positive definite diagonal matrices. The body heading axis needs to be calculated in the coplanar mode given the desired yaw angle. Hence, the normalized thrust vector of the inertial frame should first be calculated:

$$\hat{n} = F_{des,w}/\|F_{des,w}\| = [n_1, n_2, n_3]^T, \tag{24}$$

based on the expression of the rotation matrix defined in modeling. Here $\cos(\sin^{-1}(n_1))$ is denoted as $n_4$ which yields:

$$R_{y,h} = \begin{bmatrix} n_4 & 0 & n_1 \\ 0 & 1 & 0 \\ -n_1 & 0 & n_4 \end{bmatrix}, \tag{25}$$

if $n_4=0$ marking the singularity, then denote $R_{x,h}=I_{3\times3}$ Otherwise:

$$R_{x,h} = \begin{bmatrix} 1 & 0 & 0 \\ 0 & n_3/n_4 & n_2/n_4 \\ 0 & -n_2/n_4 & n_3/n_4 \end{bmatrix}. \tag{26}$$

Let $\mu=R_{x,h}R_{y,h}R_z(\psi_{ref})\cdot[0,0,1]^T$ and $\hat{\mu}=\mu/\|\mu\|$. Then denote $\hat{\mu}=n\times u/\|n\times u\|$. Finally, the reference rotation matrix in coplanar mode is denoted as:

$$R_{des,c} = [\hat{u}\ \hat{k}\ \hat{n}]. \tag{27}$$

In the omnidirectional mode, $R_{des,o}$ is the reference input. Hence, the reference force in the body frame is given by:

$$F_{des} = R^T F_{des,w}, \tag{28}$$

in both modes. Notice $F_{des,o}=[0\ 0\ F_{z,c}]^T$ in the coplanar mode, and $F_{des,o}=[F_{x,o}\ F_{y,o}\ F_{z,o}]^T$ in the omnidirectional mode. The position control in both modes is asymptotically stable. Similarly, based on an output of the position controller of the controller 200 (e.g., implemented by the computing device 300), the computing device 300 generates and applies actuation signals for application to one or more of the first rotor assembly 144A, the second rotor assembly 144B, the third rotor assembly 164A, the fourth rotor assembly 164B, the fifth rotor assembly 184A, and the sixth rotor assembly 184B for propulsion and steering of the vehicle.

C. Control Allocation

To obtain the unique relation for minimization of control effort, the reference force and torque are converted to rotor thrust with a pseudo-inverse of the allocation matrix, which is:

$$M = A^T(AA^T)^{-1}. \tag{29}$$

Then, the reference rotor thrust can be computed by:

$$f_{rotor,com} = M\begin{bmatrix} F_{des} \\ T_{des} \end{bmatrix}. \tag{30}$$

IV. Simulation Results and Discussions

This section presents simulation scenarios in MATLAB and results to illustrate the enhanced performance of the vehicle 100. A list of chosen modeling parameters in simulation is shown in Table 1, and a list of controller parameters is shown in Table 2.

TABLE 1

Model parameters of the transformable UAV in simulations

| Symbol | Definition | Value |
|---|---|---|
| m | Total mass | 0.945 kg |
| l | Distance between rotors and $O_b$ | 0.16 m |
| $J_{arm\ 3\text{-}4,0}$ | Inertia tensor matrix of the green arm at $\mu = 0$ | $\begin{bmatrix} 0.0008 & -0.0005 & 0 \\ -0.0004 & 0.0009 & 0 \\ 0 & 0 & 0.0016 \end{bmatrix} kg\cdot m^2$ |
| $J_{arm\ 5\text{-}6.0}$ | Inertia tensor matrix of the blue arm at $\mu = 0$ | $\begin{bmatrix} 0.0015 & 0 & 0 \\ 0 & 0.0004 & 0 \\ 0 & 0 & 0.0018 \end{bmatrix} kg\cdot m^2$ |
| $J_{rest,0}$ | Inertia tensor matrix of rest parts at $\mu = 0$ | $\begin{bmatrix} 0.0024 & 0.0005 & 0 \\ 0.0004 & 0.0016 & 0 \\ 0 & 0 & 0.0072 \end{bmatrix} kg\cdot m^2$ |
| $\mu_0$ | Controller switching flag | 0.8 |
| g | Gravity acceleration | $9.81\ m/s^2$ |
| $\alpha$ | Rotor dynamics coefficient | 9 |
| $f_{rotor,max}$ | Rotor max thrust | 8.5 N |
| $k_f$ | Rotor thrust coefficient | $1.21 \cdot 10^{-6}\ N/rad^2$ |
| $k_{\tau\text{-}f}$ | Rotor thrust to torque coefficient | 0.012 m |
| $C_v$ | Translational Drag Coefficient | $0.25\ N \cdot s^2/m^2$ |
| $C_\omega$ | Rotational Drag Coefficient | $0.005\ N \cdot m \cdot s^2/rad^2$ |

TABLE 2

| Control Parameters | | |
|---|---|---|
| **Coplanar Mode** | | |
| | $k_p$ | $k_i$ |
| Position | $4I_3$ | $0.08I_3$ |
| Orientation | $\begin{bmatrix} 5 & 0 & 0 \\ 0 & 5 & 0 \\ 0 & 0 & 2 \end{bmatrix}$ | $\begin{bmatrix} 0.12 & 0 & 0 \\ 0 & 0.12 & 0 \\ 0 & 0 & 0.048 \end{bmatrix}$ |
| | $k_p$ | $k_d$ |
| Velocity | $3I_3$ | $0.4I_3$ |
| Angular Rate | $\begin{bmatrix} 9 & 0 & 0 \\ 0 & 9 & 0 \\ 0 & 0 & 4.5 \end{bmatrix}$ | $\begin{bmatrix} 1.2 & 0 & 0 \\ 0 & 1.2 & 0 \\ 0 & 0 & 0.5 \end{bmatrix}$ |
| **Omni Directional Mode** | | |
| | $k_p$ | $k_i$ |
| Position | $3I_3$ | $0.06I_3$ |
| Orientation | $5I_3$ | $0.12I_3$ |
| | $k_p$ | $k_d$ |
| Velocity | $2.4I_3$ | $0.3I_3$ |
| Angular Rate | $9I_3$ | $1.2I_3$ |

A. Simulation Scenario

The most challenging and significant mission for the transformable UAV is the combined flight containing under-actuated long-range flight and omnidirectional motions in the air. The commanded trajectory consists of three phases, and the 2-second transitions happen between two phases.

1) Phase 1 ($0\le t<16$ s): The vehicle 100 is first commanded to take off, accelerate, and fly to a long-distance set point as a coplanar hexacopter. The vehicle 100 decelerates as it approaches the destination, and the transition begins.

2) Transition C→O($16\le t<18$ s): The vehicle 100 transforms from the coplanar mode to the omnidirectional mode at a suitable translational speed, and then the system becomes fully actuated.

(3) Phase 2 ($18\le t<42$ s): The vehicle 100 enters the omnidirectional mode. In real applications, sinusoidal signals are used to generate reference 3D positional tracking with steer attitude ($18\le t<30$ s) and 30 rotational tracking with steer position ($30\le t<42$ s) separately, representing two different aerial tasks, such as aerial writing and inspection, respectively.

(4) Transition O→C($42\le t<44$ s): The vehicle 100 transforms from the omnidirectional mode back to the coplanar directional mode at a suitable translational speed, and the system becomes under actuated again.

(5) Phase 3 ($44\le t<60$ s): The vehicle 100 accelerates and flies towards the landing area. As the vehicle 100 approaches the target area, the vehicle velocity reduces, and the vehicle 100 finally finishes the landing.

Figure 7:
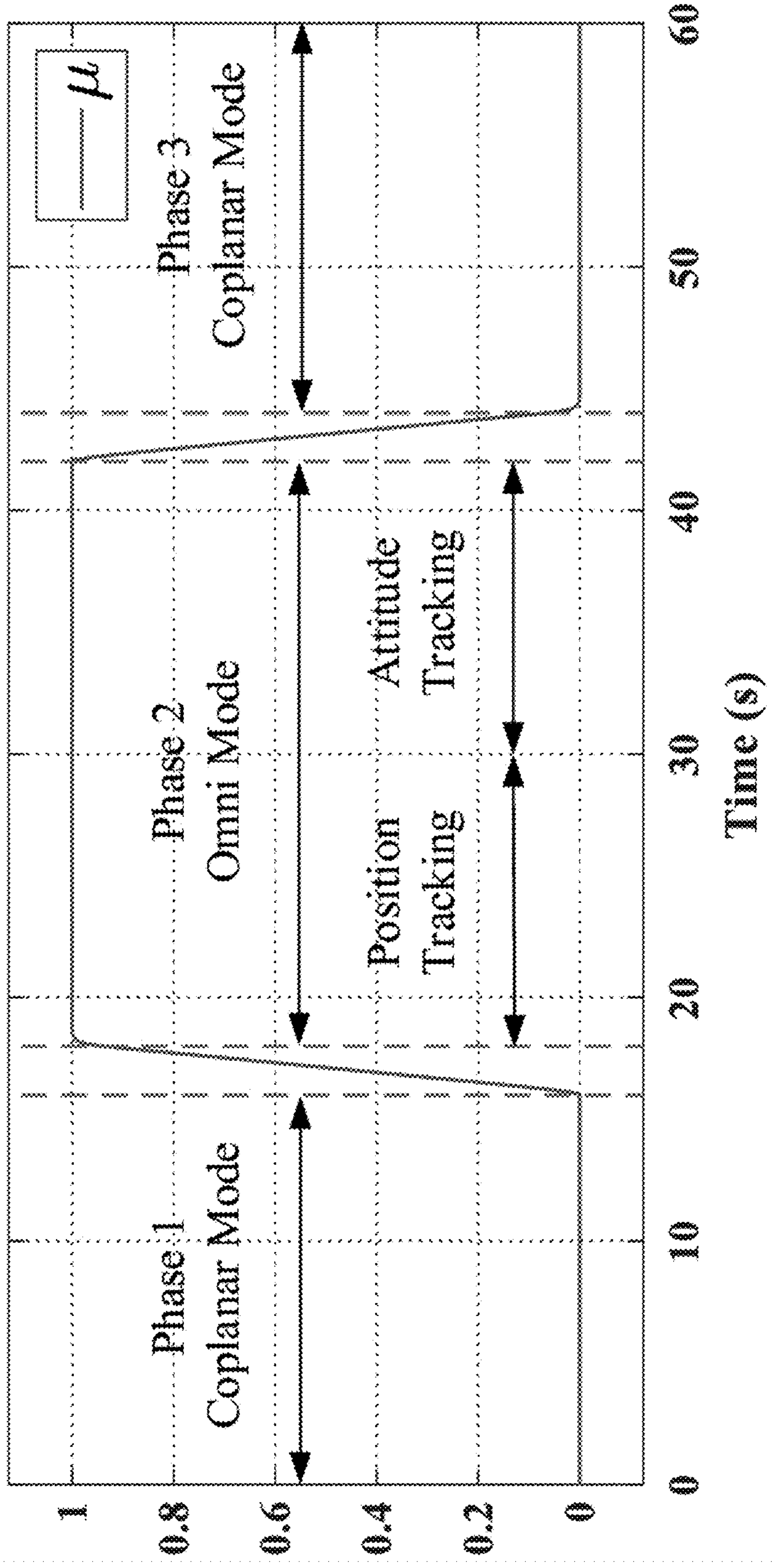
FIG. 7 is a graphical representation showing flight mode switching of the vehicle of FIGS. 1A-1G.
Figure 8A:
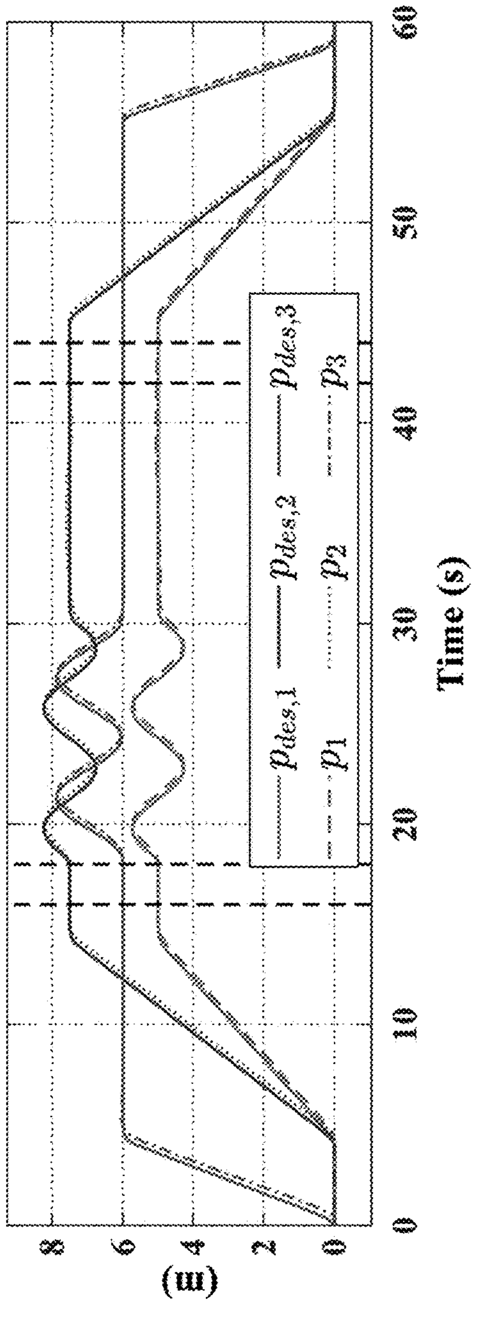
FIGS. 8A-8D are a series of graphical representations showing position and velocity tracking results of the vehicle of FIGS. 1A-1G.
Figure 8B:
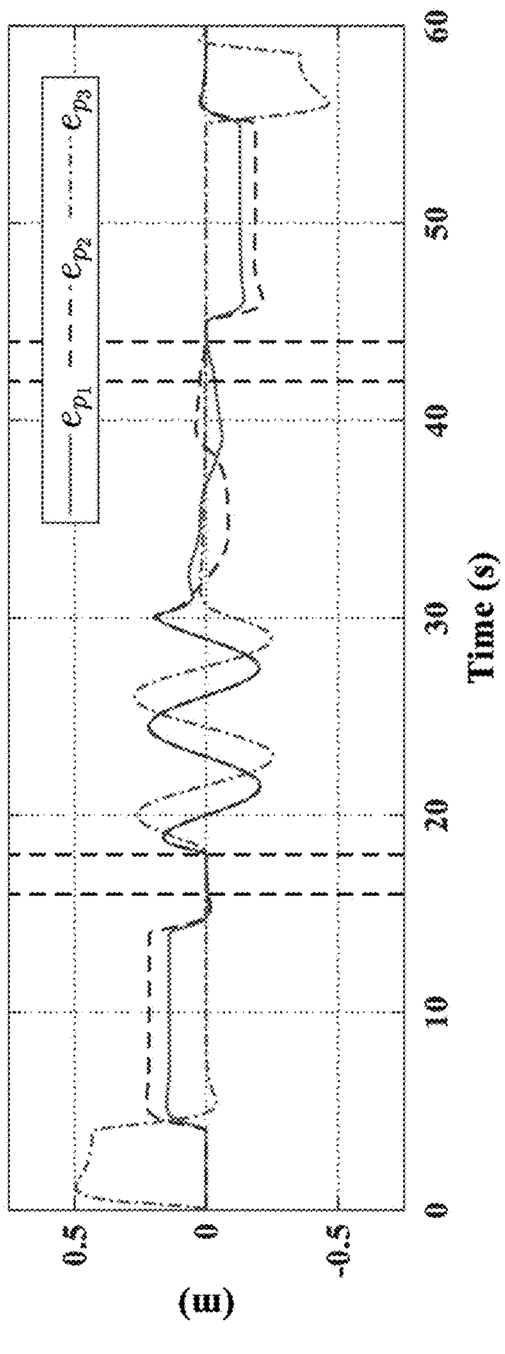
Figure 8C:
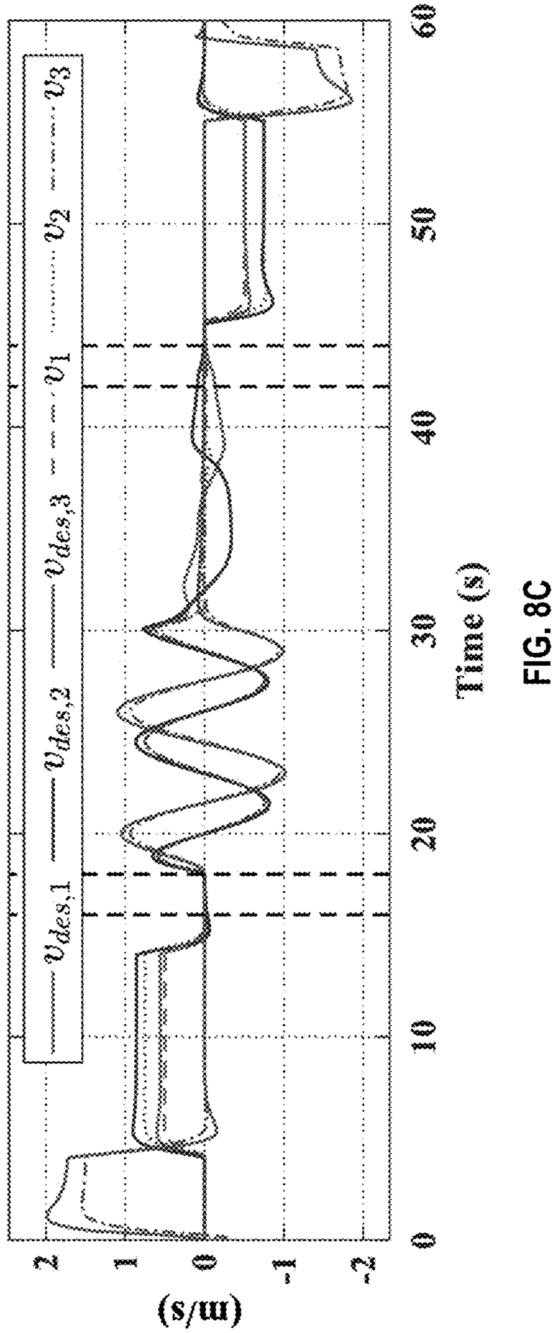
Figure 8D:
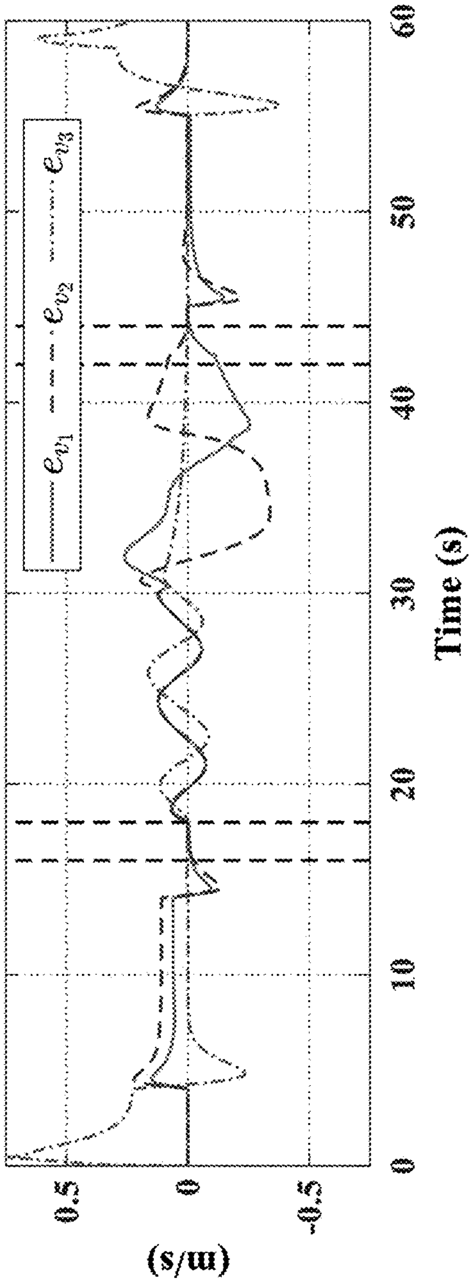
Figure 9A:
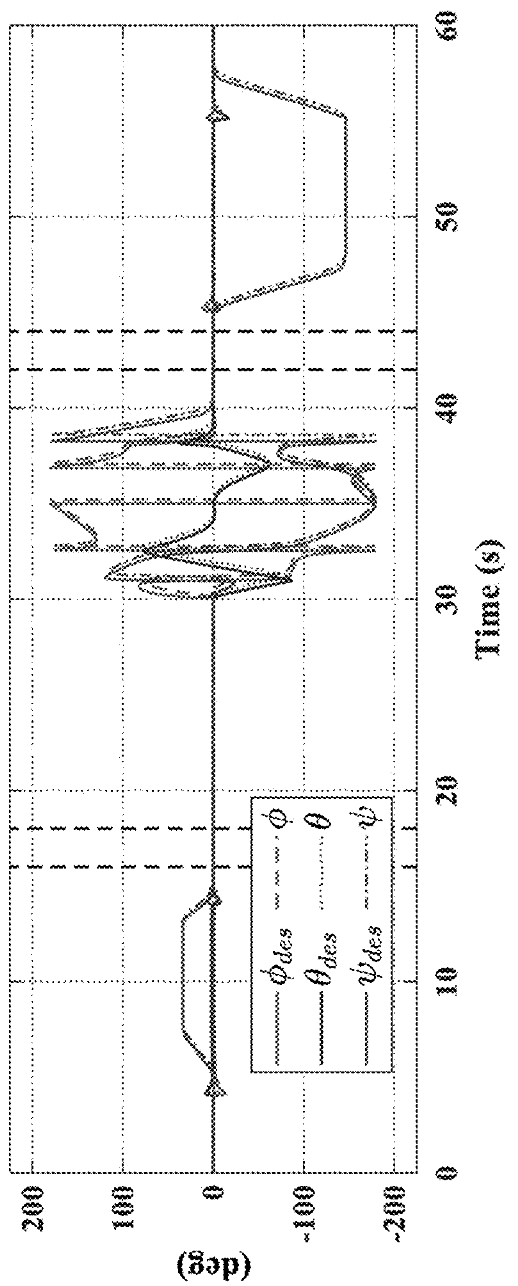
FIGS. 9A-9D are a series of graphical representations showing angular velocity error of the vehicle of FIGS. 1A-1G.
Figure 9B:
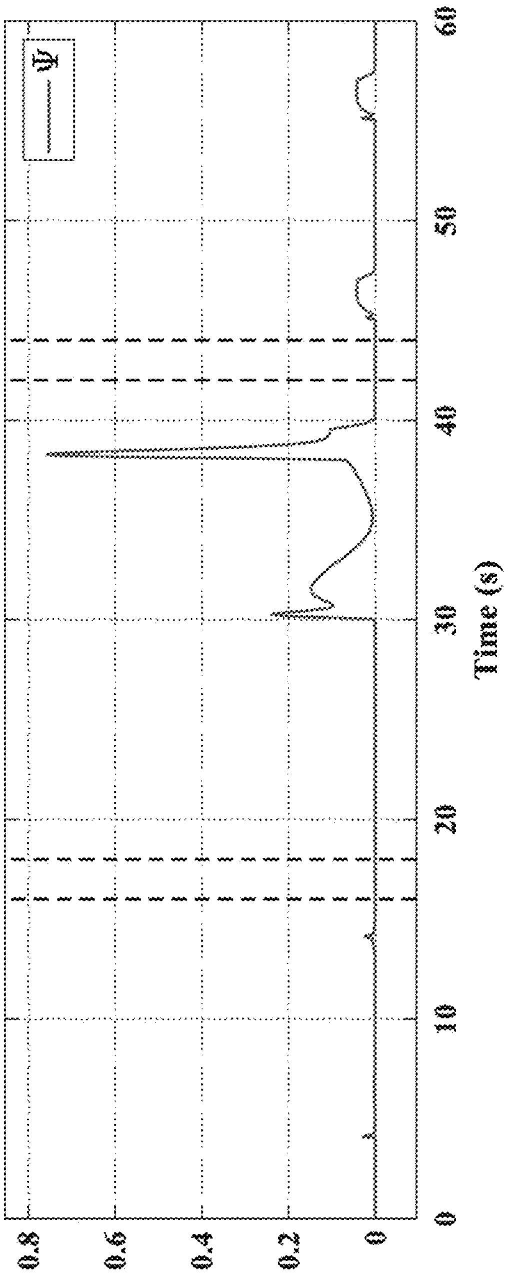
Figure 9C:
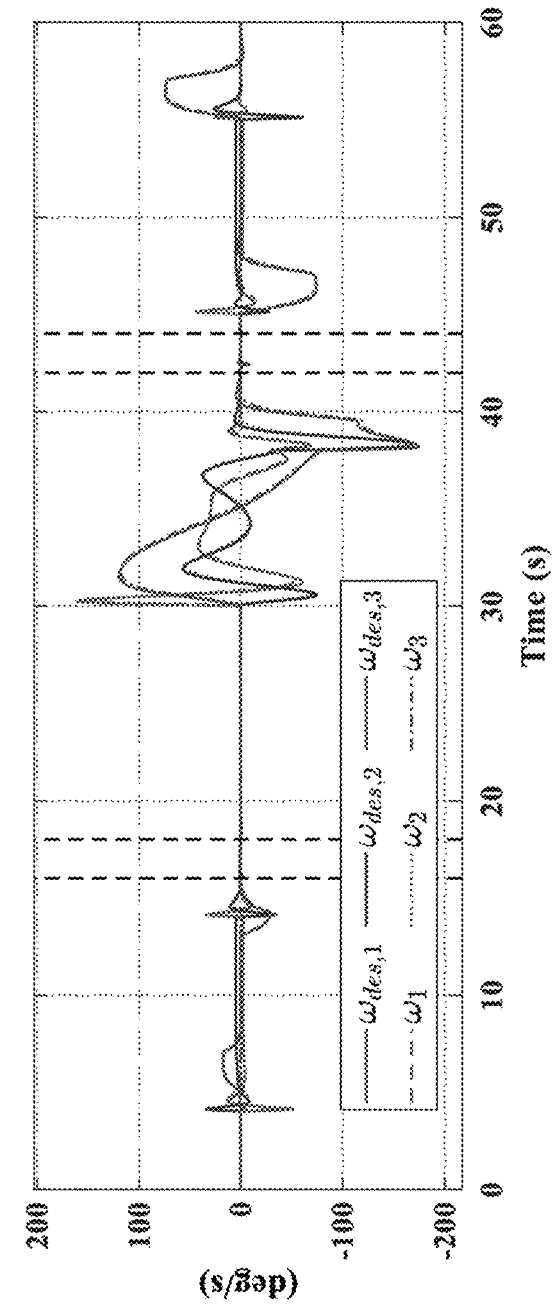
Figure 9D:
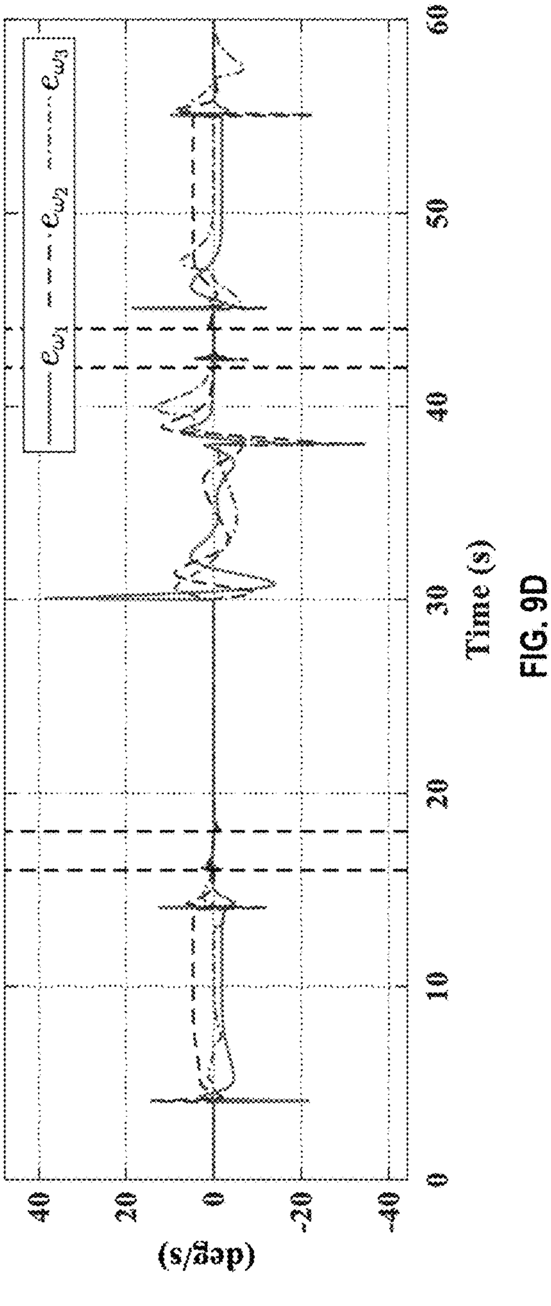

FIG. 7 shows the mode (μ) switching plot. To describe the servo and the rotational structure dynamics during the transition associated with μ, a saturated damping signal is selected by going through a first-order low pass filter $$G_{LP} = \frac{\omega_0}{s+\omega_0},\ \omega_0 \cong 6 \text{ rad/s}.$$

B. Trajectory Tracking Results

FIGS. 8A-8D include results for the position tracking $p\rightarrow p_{des}$, the position error $e_p$, the velocity tracking $v\rightarrow v_{des}$, and the velocity error $e_v$.

Ramping references are selected to represent a high-speed and long-distance motion in the coplanar mode. At the same time, the maximum position error reaches up to 0.49 m, and the maximum velocity error reaches up to 0.74 m/s. Sinusoidal references are designed for the position tracking reference of omni mode ($18\le t<30$ s). It is worth to note that a fast attitude tracking with steer reference position ($30\le t<42$ s) would cause relatively large tracking error. During each transition, the tracking errors are controlled in small ranges ($e_p<0.001$ m, $e_v<0.02$ m/s).

Moreover, the orientation tracking $R\rightarrow R_{des}$, the orientation tracking $$\text{error } \Psi(R, R_{des}) = \frac{1}{2}tr\left[I - R_{des}^T R\right],$$

the angular velocity tracking $\omega\rightarrow\omega_{des}$, and the angular velocity error $e_\omega$ are shown in FIGS. 9A-9D. In the coplanar mode, tracking error is relatively large ($e_R<0.044$, $e_\omega<23$ deg/s) when changing the heading direction to the targeting area. During $30\le t<42$ s, the tracking errors ($e_R<0.77$, $e_\omega<38$ deg/s) are caused by the UAV fast rotations to adjust roll, pitch, and yaw angles simultaneously (aggressive references). Similar to position tracking, the orientation tracking errors are controlled in small ranges ($e_R<0.44$, $e_\omega<0.2$ deg/s) during each transition.

C. Rotor Thrust, Force Efficiency, and Disturbance

Figure 10A:
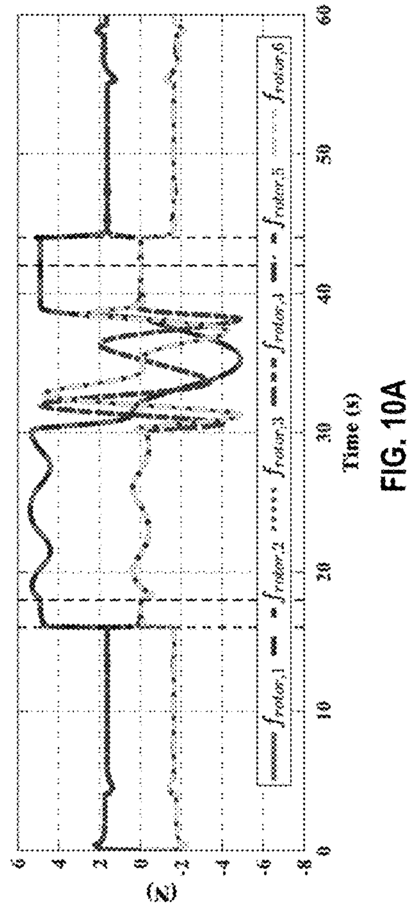
FIGS. 10A-10C are a series of graphical representations showing rotor thrust, force efficiency, and internal disturbance torque of the vehicle of FIGS. 1A-1G.
Figure 10B:
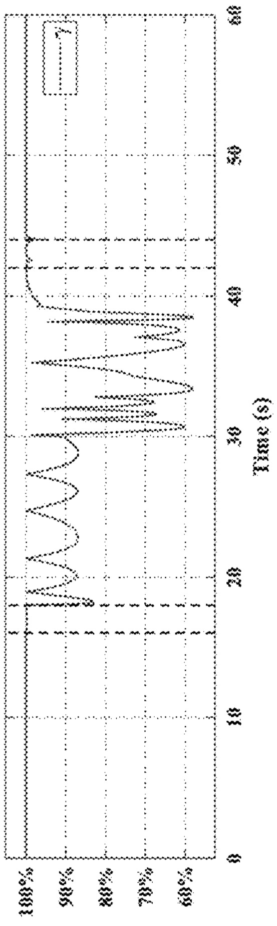
Figure 10C:
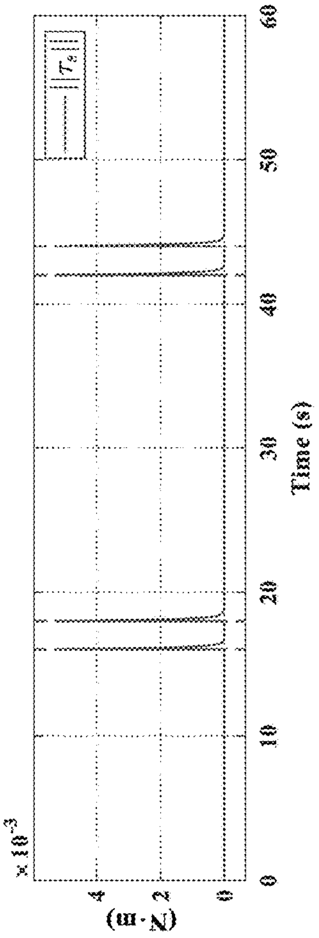

In FIGS. 10A-10C, all rotors give thrusts within the constraints during the whole flight mission. In the coplanar mode (phases 1&3), $\gamma=100\%$ corresponds to upward heading directions of all rotors in the body frame. In phase 2, the fully actuated omnidirectional motions with lower force efficiency $57.7\%\le\gamma\le 100\%$ requiring more thrust for each rotor, especially during the steer position part. Hence, the orientation trajectory should cover the red zone in FIG. 5 as much as possible. It is also worth noting that the internal disturbance torque ($\|\tau\|\le 0.0053$N m) at the beginning and the end of each transition time has little influence on orientation tracking ($e_R<0.002$, $e_\omega<6.4$ deg/s), which shows the effectiveness of the switching control design.

D. Comparison with Coplanar-Only and Omni-Only UAVs

Compared with coplanar-only UAVs, it is straightforward that the vehicle 100 has omnidirectional flight capability. The vehicle 100 does not require other robot arms for many aerial manipulation tasks or only needs less complicated modules to fulfill the same mission. To, the electrical power consumption of the vehicle 100 is calculated in Eq. (31) in comparison with omni-only UAVs. Ignoring the power cost of non-rotor modules (flight controller, servo, etc.), power consumption is denoted by:

$$P \cong \Sigma_{i=1}^{6} P_{rotor,i}. \tag{31}$$

An omni-only UAV with a fixed frame is modeled to do the same task as the simulation scenario above. The omni-only UAV flies with $\gamma=100\%$ (roll and pitch angles are zero) at phases 1 and 3.

Figure 11:
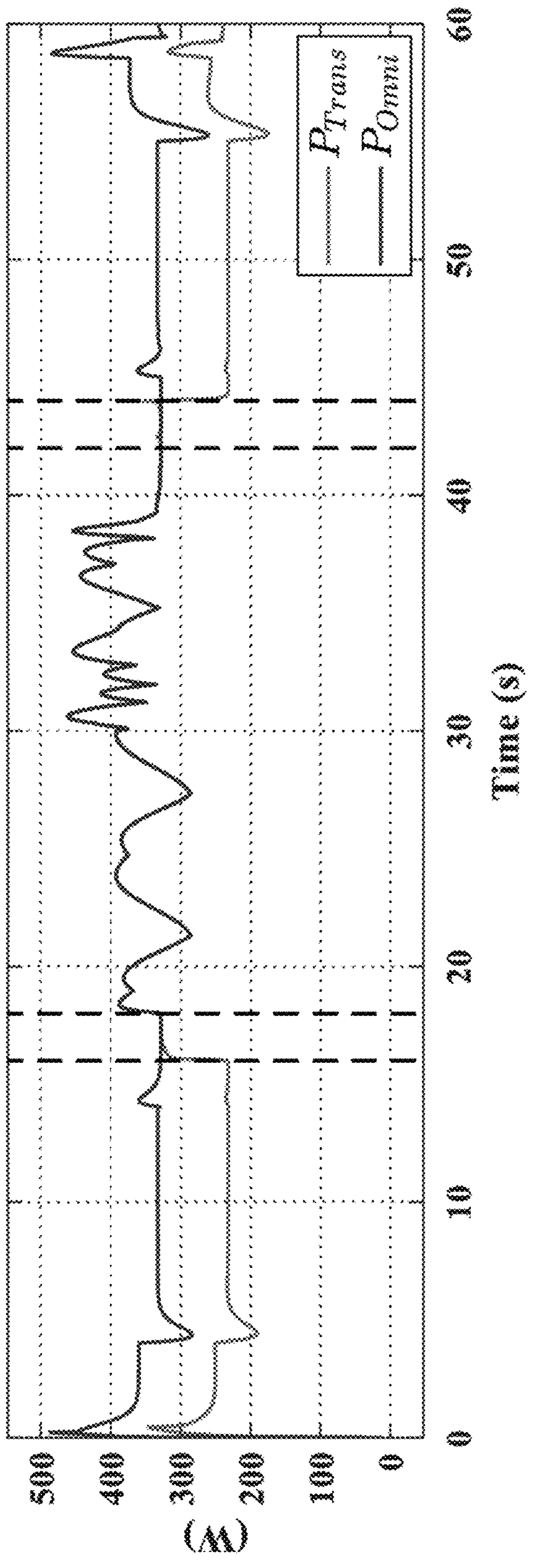
FIG. 11 is a graphical representation showing power consumption of the vehicle of FIGS. 1A-1G.

In FIG. 11, the omni-only UAV costs more electrical power during phases than the vehicle 100 while performing the same flight mission. The total energy cost of the omni-only UAV is 21134J, and that of the vehicle 100 is 17782J.

The vehicle 100 combines both coplanar and omnidirectional flight features. In particular, the vehicle 100 is capable of both under-actuated coplanar flight and fully actuated omnidirectional motions. The vehicle 100 includes the controller with a cascade structure on $\mathbb{R}^{3}{}^{3}\times SO(3)$ to achieve flight capability via different modes with respect to disturbances.

V. Computer-Implemented System

Figure 12:
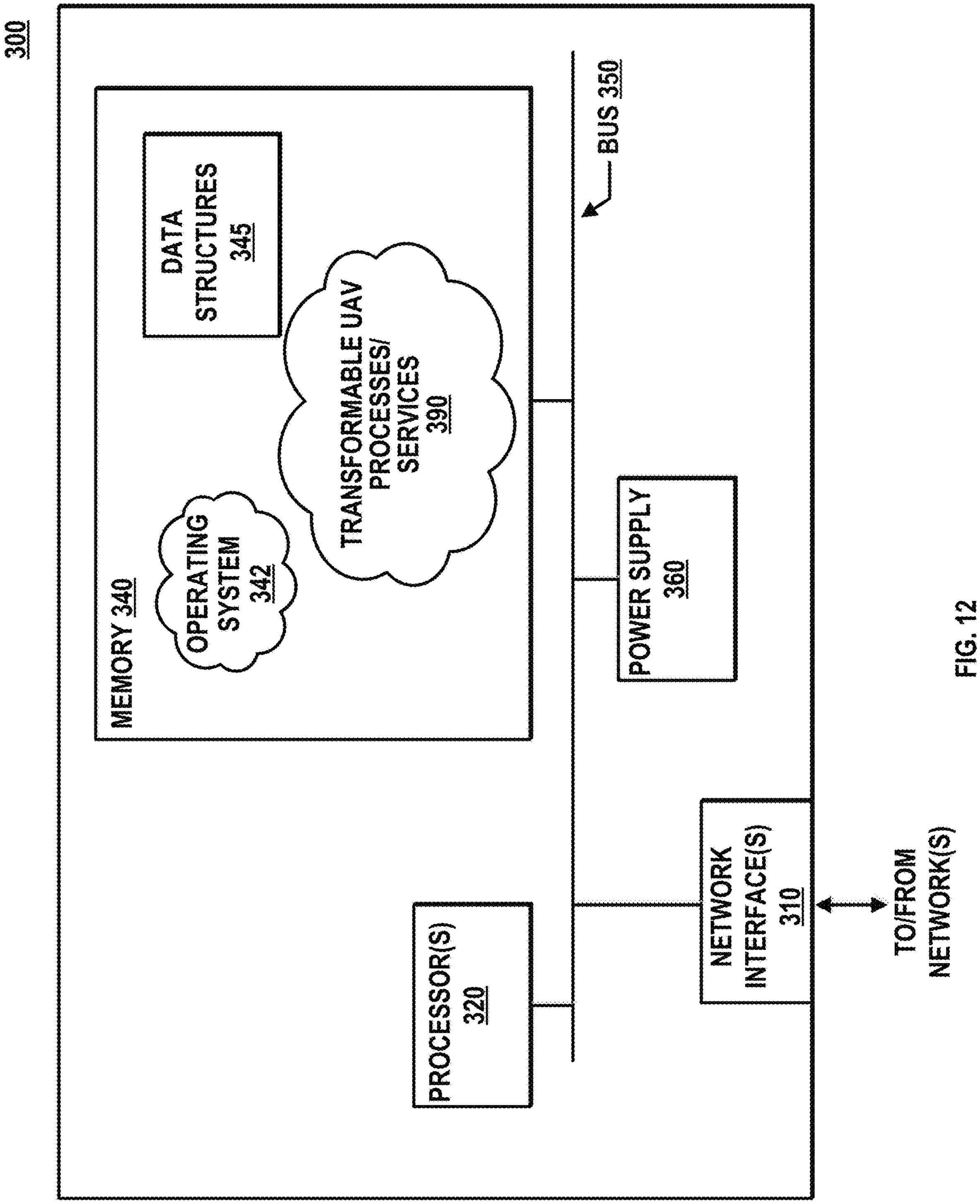
FIG. 12 is a simplified diagram showing an example computing system for implementation of the control architecture of FIGS. 6A and 6B for operation of the vehicle of FIGS. 1A-1G.

FIG. 12 is a schematic block diagram showing the computing device 300 that may be used with one or more embodiments described herein, e.g., as a component of vehicle 100 of FIGS. 1A-3C and 6A and/or implementing the controller 200 shown in FIGS. 6A and 6B.

Computing device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes computing device 300 by, inter alia, invoking operations in support of software processes and/or services executing on the device. These software processes and/or services may include transformable UAV processes/services 390 which can include a set of instructions within the memory 340 that implement aspects of controller 200 when executed by the processor 320. Note that while transformable UAV processes/services 390 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the transformable UAV processes/services 390 is shown as a standalone process, those skilled in the art will appreciate that this process may be executed as a routine or module within other processes.

Methods

FIG. 13 shows a method 400 associated with the vehicle 100 outlined herein. The functions performed in the processes and methods may be implemented in differing order. Furthermore, the outlined steps and operations are provided as examples, and some of the steps and operations may be optional, combined into fewer steps and operations, or expanded into additional steps and operations without detracting from the essence of the disclosed embodiments.

As shown, step 402 of method 400 includes providing a vehicle including: a first arm in association with a body; a second arm in association with the body, the second arm being rotatable by a servo motor between a first position associated with a coplanar mode of the vehicle and a second position associated with an omnidirectional mode; and a third arm in association with the body, the third arm being rotatable between a first position associated with the coplanar mode of the vehicle and a second position associated with the omnidirectional mode, wherein rotation of the second arm between the first position and the second position of the second arm causes concurrent rotation of the third arm between the first position and the second position of the third arm. The second arm is oriented coplanar with the first arm when in the first position of the second arm, and the second arm is oriented mutually perpendicular with the first arm when in the second position of the second arm. The third arm is oriented coplanar with the first arm and the second arm and is oriented at a 45 degree angle relative to the first arm and the second arm when in the first position of the third arm. When in the second position of the third arm, the third arm is oriented mutually perpendicular with the first arm and the second arm. Step 404 of method 400 includes: applying, by a processor in communication with a memory and the servo motor, an actuation signal to the servo motor. Step 406 of method 400 includes rotating, by the servo motor, the second arm between the first position and the second position of the second arm. Step 408 of method 400 can occur concurrently with step 406 as a result of the rotation by the servo motor, and can include rotating the third arm about an axis that is normal to a shared plane of the first arm and the third arm and simultaneously rotating the third arm by 90 degrees about an axis of elongation of the third arm.

The first arm can include a first rotor assembly and a second rotor assembly, the second arm can include a third rotor assembly and a fourth rotor assembly and the third arm can include a fifth rotor assembly and a sixth rotor assembly. Step 410 of method 400 includes generating an actuation signal for application to one or more of the first rotor assembly, the second rotor assembly, the third rotor assembly, the fourth rotor assembly, the fifth rotor assembly, and the sixth rotor assembly for propulsion of the vehicle based on an output of a controller implemented at the processor. Step 412 can include applying, by the processor in communication with the memory, the actuation signal to one or more of the first rotor assembly, the second rotor assembly, the third rotor assembly, the fourth rotor assembly, the fifth rotor assembly, and the sixth rotor assembly for propulsion of the vehicle.

Importantly, the third rotor assembly and the fourth rotor assembly of the second arm are oriented coplanar with the first rotor assembly and the second rotor assembly of the first arm when the second arm is in the first position. The third rotor assembly and the fourth rotor assembly of the second arm are oriented 90 degrees relative to the first rotor assembly and the second rotor assembly of the first arm when the second arm is in the second position. The fifth rotor assembly and the sixth rotor assembly of the third arm are oriented 180 degrees relative to the first rotor assembly and the second rotor assembly of the first arm and the third rotor assembly and the fourth rotor assembly of the second arm when the third arm is in the first position. The fifth rotor assembly and the sixth rotor assembly of the third arm are oriented mutually perpendicular with the first rotor assembly and the second rotor assembly of the first arm and the third rotor assembly and the fourth rotor assembly of the second arm when the third arm is in the second position.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A vehicle, comprising:

a plurality of arms in association with a body and a plurality of rotor assemblies, the plurality of arms being collectively operable for positioning according to an operating mode of the vehicle; and a processor in communication with a memory, a plurality of sensors operable for measuring a set of kinematic values associated with the vehicle and the plurality of rotor assemblies, the memory including instructions executable by the processor to:

evaluate, based on measurements from the plurality of sensors, the set of kinematic values associated with the vehicle and an operating mode value ($\mu$) indicative of an operating mode of the vehicle;

generate, by a position controller implemented at the processor of the vehicle, a position control output including a reference force vector ($F_{des}$) based on the set of kinematic values, the operating mode value of the vehicle, and a reference trajectory, the reference trajectory being dependent upon the operating mode value of the vehicle;

generate, by an attitude controller implemented at the processor of the vehicle, a reference torque ($T_{des}$) based on the set of kinematic values and a reference rotation matrix ($R_{des}$); and apply, by the processor, an actuation signal to one or more rotor assemblies of the plurality of rotor assemblies of the vehicle based on the reference force vector and the reference torque.

2. The vehicle of claim 1, the memory further including instructions executable by the processor to:

obtain, for application as input to the attitude controller, the reference rotation matrix as an output of the position controller based on the reference trajectory including a reference yaw angle ($\psi_{des}$) and a reference position ($p_{des}$).

3. The vehicle of claim 1, the memory further including instructions executable by the processor to:

obtain, for application as input to the attitude controller, the reference rotation matrix from the reference trajectory independent of the position controller when the operating mode value indicates that the vehicle is in an omnidirectional mode.

4. The vehicle of claim 1, the memory further including instructions executable by the processor to:

access, by the position controller and based on the operating mode value of the vehicle indicating a coplanar mode, a reference yaw angle ($\psi_{des}$) and reference position ($p_{des}$) as the reference trajectory; and determine, based on the reference yaw angle and the reference position, the reference rotation matrix and the reference force vector of the position control output for the vehicle when in coplanar mode.

5. The vehicle of claim 1, the memory further including instructions executable by the processor to:

access, by the position controller and based on the operating mode value of the vehicle indicating an omnidirectional mode, the reference rotation matrix and a reference position ($p_{des}$) as the reference trajectory; and determine, based on the reference rotation matrix and the reference position, the reference force vector of the position control output for the vehicle when in omnidirectional mode.

6. The vehicle of claim 1, the vehicle including:

a first arm of the plurality of arms, the first arm including a first rotor assembly and a second rotor assembly of the plurality of rotor assemblies;

a second arm of the plurality of arms, the second arm including a third rotor assembly and a fourth rotor assembly, the second arm being rotatable between a first position associated with a coplanar mode of the vehicle and a second position associated with an omnidirectional mode, wherein the second arm is oriented coplanar with the first arm when in the first position of the second arm and wherein the second arm is oriented mutually perpendicular with the first arm when in the second position of the second arm; and a third arm of the plurality of arms, the third arm including a fifth rotor assembly and a sixth rotor assembly, the third arm being rotatable between a first position associated with the coplanar mode of the vehicle and a second position associated with the omnidirectional mode, wherein the third arm is oriented coplanar with the first arm and the second arm when in the first position of the third arm, wherein the third arm is oriented mutually perpendicular with the first arm and the second arm when in the second position of the third arm, and wherein transitioning the third arm between the first position and the second position includes rotating the third arm 90 degrees about an axis of elongation of the third arm.

7. The vehicle of claim 6, wherein the third rotor assembly and the fourth rotor assembly of the second arm are oriented coplanar with the first rotor assembly and the second rotor assembly of the first arm when the second arm is in the first position.

8. The vehicle of claim 6, wherein the third rotor assembly and the fourth rotor assembly of the second arm are oriented 90 degrees relative to the first rotor assembly and the second rotor assembly of the first arm when the second arm is in the second position.

9. The vehicle of claim 6, wherein the third arm is oriented at a 45 degree angle relative to the first arm and the second arm and is coplanar with the first arm and the second arm when the third arm is in the first position.

10. The vehicle of claim 6, wherein the fifth rotor assembly and the sixth rotor assembly of the third arm are oriented 180 degrees relative to the first rotor assembly and the second rotor assembly of the first arm and the third rotor assembly and the fourth rotor assembly of the second arm when the third arm is in the first position.

11. The vehicle of claim 6, wherein the fifth rotor assembly and the sixth rotor assembly of the third arm are oriented mutually perpendicular with the first rotor assembly and the second rotor assembly of the first arm and the third rotor assembly and the fourth rotor assembly of the second arm.

12. The vehicle of claim 6, further comprising:

a transition mechanism operable for transitioning the second arm between the first position of the second arm and the second position of the second arm and for transitioning the third arm between the first position of the third arm and the second position of the third arm, the transition mechanism including a servo motor and a linkage assembly that connects the second arm to the third arm such that rotation of the second arm about a fulcrum of the second arm causes concurrent rotation of the third arm about an axis of elongation of the third arm.

13. The vehicle of claim 12, the memory further including instructions executable by the processor to:

apply an actuation signal to the servo motor of the transition mechanism to transition the second arm between the first position and the second position of the second arm, wherein transitioning the second arm between the first position and the second position of the second arm concurrently transitions the third arm between the first position and the second position of the third arm.

14. A method, comprising:

evaluating, at a processor of a vehicle and based on measurements from a plurality of sensors of the vehicle, a set of kinematic values associated with the vehicle and an operating mode value (x) indicative of an operating mode of the vehicle;

the processor being in communication with a memory, the plurality of sensors operable for measuring the set of kinematic values associated with the vehicle, and a plurality of rotor assemblies of the vehicle; and the vehicle including a plurality of arms in association with a body and the plurality of rotor assemblies, the plurality of arms being collectively operable for positioning according to the operating mode of the vehicle;

generating, by a position controller implemented at the processor of the vehicle, a position control output including a reference force vector ($F_{des}$) based on the set of kinematic values, the operating mode value of the vehicle, and a reference trajectory, the reference trajectory being dependent upon the operating mode value of the vehicle;

generating, by an attitude controller implemented at the processor of the vehicle, a reference torque ($T_{des}$) based on the set of kinematic values and a reference rotation matrix ($R_{des}$); and applying, by the processor, an actuation signal to one or more rotor assemblies of the plurality of rotor assemblies of the vehicle based on the reference force vector and the reference torque.

15. The method of claim 14, further comprising:

obtaining, for application as input to the attitude controller, the reference rotation matrix as an output of the position controller based on the reference trajectory including a reference yaw angle ($\psi_{des}$) and a reference position ($p_{des}$).

16. The method of claim 14, further comprising:

obtaining, for application as input to the attitude controller, the reference rotation matrix from the reference trajectory independent of the position controller when the operating mode value indicates that the vehicle is in an omnidirectional mode.

17. The method of claim 14, further comprising:

accessing, by the position controller and based on the operating mode value of the vehicle indicating a coplanar mode, a reference yaw angle ($\psi_{des}$) and reference position ($p_{des}$) as the reference trajectory; and determining, based on the reference yaw angle and the reference position, the reference rotation matrix ($p_{des}$), the reference rotation matrix and the reference force vector of the position control output for the vehicle when in coplanar mode.

18. The method of claim 14, further comprising:

accessing, by the position controller and based on the operating mode value of the vehicle indicating an omnidirectional mode, the reference rotation matrix and a reference position ($p_{des}$) as the reference trajectory; and determining, based on the reference rotation matrix and the reference position, the reference force vector of the position control output for the vehicle when in omnidirectional mode.

19. The method of claim 14, the vehicle including:

a first arm of the plurality of arms, the first arm including a first rotor assembly and a second rotor assembly of the plurality of rotor assemblies;

a second arm of the plurality of arms, the second arm including a third rotor assembly and a fourth rotor assembly, the second arm being rotatable between a first position associated with a coplanar mode of the vehicle and a second position associated with an omnidirectional mode, wherein the second arm is oriented coplanar with the first arm when in the first position of the second arm and wherein the second arm is oriented mutually perpendicular with the first arm when in the second position of the second arm;

a third arm of the plurality of arms, the third arm including a fifth rotor assembly and a sixth rotor assembly, the third arm being rotatable between a first position associated with the coplanar mode of the vehicle and a second position associated with the omnidirectional mode, wherein the third arm is oriented coplanar with the first arm and the second arm when in the first position of the third arm, wherein the third arm is oriented mutually perpendicular with the first arm and the second arm when in the second position of the third arm, and wherein transitioning the third arm between the first position and the second position includes rotating the third arm 90 degrees about an axis of elongation of the third arm; and a transition mechanism operable for transitioning the second arm between the first position of the second arm and the second position of the second arm and for transitioning the third arm between the first position of the third arm and the second position of the third arm, the transition mechanism including a servo motor and a linkage assembly that connects the second arm to the third arm such that rotation of the second arm about a fulcrum of the second arm causes concurrent rotation of the third arm about an axis of elongation of the third arm.

20. The method of claim 19, further comprising:

applying an actuation signal to the servo motor of the transition mechanism to transition the second arm between the first position and the second position of the second arm, wherein transitioning the second arm between the first position and the second position of the second arm concurrently transitions the third arm between the first position and the second position of the third arm.

* * * * *